(12) United States Patent
Zhang et al.

(10) Patent No.: US 12,228,410 B2
(45) Date of Patent: Feb. 18, 2025

(54) LOCALIZATION FOR AUTONOMOUS MOVEMENT USING VEHICLE SENSORS

(71) Applicant: Volvo Car Corporation, Gothenburg (SE)

(72) Inventors: Xinkai Zhang, Sunnyvale, CA (US); Sihao Ding, Sunnyvale, CA (US); Harshavardhan Reddy Dasari, Santa Clara, CA (US)

(73) Assignee: Volvo Car Corporation, Gothenburg (SE)

( * ) Notice: Subject to any disclaimer, the term of this patent is extended or adjusted under 35 U.S.C. 154(b) by 32 days.

(21) Appl. No.: 17/806,871

(22) Filed: Jun. 14, 2022

(65) Prior Publication Data

US 2023/0400306 A1 Dec. 14, 2023

(51) Int. Cl.
*G01C 21/16* (2006.01)
*B60W 40/105* (2012.01)
*B60W 40/114* (2012.01)

(52) U.S. Cl.
CPC ......... *G01C 21/183* (2020.08); *B60W 40/105* (2013.01); *G01C 21/16* (2013.01);
(Continued)

(58) Field of Classification Search
CPC ... G01C 21/183; G01C 21/16; B60W 40/105; B60W 40/114; B60W 2422/95;
(Continued)

(56) References Cited

U.S. PATENT DOCUMENTS 11,300,689 B2 * 4/2022 Noble .................... G01S 19/49
11,468,545 B1 * 10/2022 Peric ...................... G06V 10/34
(Continued)

FOREIGN PATENT DOCUMENTS

EP 3462132 A2 * 4/2019

OTHER PUBLICATIONS

Jose Angle Matute-Peaspan, Joshue Perez, and Asier Zubizarreta, A Fail-Operational Control Architecture Approach and Dead-Reckoning Strategy in Case of Positioning Failures, 20 Sensors (Jan. 13, 2020), available at https://doi.org/10.3390/s20020442 (Year: 2020).*

(Continued)

*Primary Examiner* — Justin R. Blaufeld
(74) *Attorney, Agent, or Firm* — Amin, Turocy & Watson, LLP

(57) ABSTRACT

One or more embodiments herein can provide a process to determine dead-reckoning localization of a vehicle. An exemplary system can comprise a memory that stores computer executable components, and a processor that executes the computer executable components stored in the memory, wherein the computer executable components can comprise an obtaining component that obtains plural sensor readings defining movement of a vehicle, wherein the plural sensor readings comprise an inertial sensor reading, a kinematics sensor reading, and an odometry sensor reading, and a generation component that generates, based on the plural sensor readings, a pose value defining a position of the vehicle relative to an environment in which the vehicle is disposed. A sensing sub-system of the exemplary system can comprise an inertial measurement unit sensor, a kinematics sensor, and an odometry sensor.

20 Claims, 11 Drawing Sheets

(52) U.S. Cl.
CPC ....... *B60W 40/114* (2013.01); *B60W 2422/95* (2013.01); *B60W 2520/105* (2013.01); *B60W 2520/125* (2013.01); *B60W 2520/14* (2013.01); *B60W 2520/16* (2013.01); *B60W 2520/18* (2013.01); *B60W 2520/28* (2013.01); *B60W 2530/18* (2013.01)

(58) Field of Classification Search
CPC ..... B60W 2520/105; B60W 2520/125; B60W 2520/14; B60W 2520/16; B60W 2520/18; B60W 2520/28; B60W 2530/18
See application file for complete search history.

(56) References Cited

U.S. PATENT DOCUMENTS

| | | | |
|---|---|---|---|
| 11,561,553 B1* | 1/2023 | Dydek | G05D 1/0246 |
| 2007/0005212 A1* | 1/2007 | Xu | B60R 21/0132 |
| | | | 701/45 |
| 2008/0033645 A1* | 2/2008 | Levinson | G01S 19/49 |
| | | | 701/469 |
| 2008/0071476 A1* | 3/2008 | Hoshizaki | G01C 21/165 |
| | | | 701/472 |
| 2008/0294342 A1* | 11/2008 | Hoshizaki | G01S 19/47 |
| | | | 701/472 |
| 2013/0218461 A1* | 8/2013 | Naimark | G01C 21/12 |
| | | | 701/505 |
| 2016/0209846 A1* | 7/2016 | Eustice | G06T 7/75 |
| 2018/0231385 A1* | 8/2018 | Fourie | G01C 21/188 |
| 2018/0364787 A1* | 12/2018 | Fukumoto | H04M 1/00 |
| 2018/0373966 A1* | 12/2018 | Beschorner | G01C 21/10 |
| 2019/0337343 A1* | 11/2019 | Ramirez Llanos | G06T 7/70 |
| 2020/0039523 A1* | 2/2020 | Ghasemalizadeh | B62D 15/025 |
| 2020/0174487 A1* | 6/2020 | Viswanathan | G05D 1/0274 |
| 2021/0080259 A1* | 3/2021 | Babu | G01C 21/1652 |
| 2021/0180984 A1* | 6/2021 | Xu | G01S 7/4808 |
| 2021/0278847 A1* | 9/2021 | Prikhodko | G05D 1/027 |
| 2022/0018681 A1* | 1/2022 | Li | G01C 25/00 |
| 2022/0018962 A1* | 1/2022 | Pan | G01S 17/66 |
| 2023/0222688 A1* | 7/2023 | Wang | G06V 10/98 |
| | | | 382/103 |
| 2023/0331298 A1* | 10/2023 | Alghooneh | B60W 50/14 |

OTHER PUBLICATIONS

Ali Barzegar, Oualid Doukhi, and Deok-Jin Lee. 2021. "Design and Implementation of an Autonomous Electric Vehicle for Self-Driving Control under GNSS-Denied Environments" Applied Sciences 11, No. 8: 3688. https://doi.org/10.3390/app11083688 (Year: 2021).*

M.T. Sabet, H.R. Mohammadi Daniali, A.R. Fathi, E. Alizadeh, Experimental analysis of a low-cost dead reckoning navigation system for a land vehicle using a robust AHRS, 95 Robotics and Autonomous Systems 37-51 (2017), available at https://doi.org/10.1016/j.robot.2017.05.010. (Year: 2017).*

K. M. Ng, S. A. C. Abdullah, A. Ahmad and J. Johari, Implementation of Kinematics Bicycle Model for Vehicle Localization using Android Sensors, 11th IEEE Control and System Graduate Research Colloquium 248-252 (2020), available at https://doi.org/10.1109/ICSGRC49013.2020.9232453. (Year: 2020).*

Extended European Search Report received for European Patent Application Serial No. 23178405.9 dated Nov. 6, 2023, 9 pages.

Fang et al., "Inertial Navigation System Based Vehicle Temporal Relative Localization with Split Covariance Intersection Filter", IEEE, Robotics and Automation Letters, vol. 7, No. 2, Apr. 2022, pp. 5270-5277.

Communication pursuant to Rule 69 EPC received for European Patent Application Serial No. 23178405.9 dated Jan. 2, 2024, 2 pages.

* cited by examiner

LOCALIZATION FOR AUTONOMOUS MOVEMENT USING VEHICLE SENSORS

TECHNICAL FIELD

The subject disclosure relates generally to estimation of pose an object, and more specifically to estimation of pose a vehicle relative to an environment for use in controlling autonomous movement of the vehicle.

BACKGROUND

In existing technologies, external sensors such as global positioning systems (GPS), cameras, Lidar and other radar, motion capturing systems, and/or the like can be employed to perform localization for a vehicle or other movable object. These processes can be timely, employ large data storage volumes and/or memory, and inefficient. Relative to a moving object, such as a moving vehicle, the generation of such localization cannot provide valuable data on a quick, efficient and/or real-time basis for a moving object (e.g., moving vehicle). That is, the large amount of data to be generated, large amount of calculations to be performed, and large amount of memory to be consumed cannot provide a fast, yet accurate, estimation of pose of a vehicle. These aspects further cannot provide reactive representations of such pose estimation relative to unforeseen, emergency and/or otherwise unintended real time changes in movement of such vehicle.

SUMMARY

The following presents a summary to provide a basic understanding of one or more embodiments described herein. This summary is not intended to identify key or critical elements, or to delineate any scope of the particular embodiments and/or any scope of the claims. The sole purpose of the summary is to present concepts in a simplified form as a prelude to the more detailed description that is presented later.

In one or more embodiments described herein, devices, systems, methods and/or apparatuses are described that can provide determination of pose of a vehicle, such as a moving vehicle. For example, provided can be a computationally efficient, data-lightweight pose estimator to determine and represent global pose of a vehicle in an environment, such as for use by an autonomous driving controller of the vehicle.

According to an embodiment, a system can comprise a memory that stores computer executable components, and a processor that executes the computer executable components stored in the memory, wherein the computer executable components comprise an obtaining component that obtains plural sensor readings defining movement of a vehicle, wherein the plural sensor readings comprise an inertial sensor reading, a kinematics sensor reading, and an odometry sensor reading. The computer executable components can comprise a generation component that generates, based on the plural sensor readings, a pose value defining a position of the vehicle relative to an environment in which the vehicle is disposed.

In one or more embodiments, the generation component can combine the inertial sensor reading, kinematics sensor reading, and odometry sensor reading, to generate the pose value defining the position of the vehicle.

In one or more embodiments, a covariance component can adjust measurements based on the sensor readings relative to one another based on observed noise.

According to another embodiment, a computer-implemented method can comprise obtaining, by a system operatively coupled to a processor, plural sensor readings defining movement of a vehicle, wherein the plural sensor readings comprise an inertial sensor reading, a kinematics sensor reading, and an odometry sensor reading, and generating, by the system, based on the plural sensor readings, a pose value defining a position of the vehicle relative to an environment in which the vehicle is disposed.

In one or more embodiments, the computer-implemented method can comprise combining, by the system, the inertial sensor reading, kinematics sensor reading, and odometry sensor reading, and employing, by the system, the combination of the sensor readings to generate the pose value defining the position of the vehicle.

According to yet another embodiment, a computer program product providing a process to determine dead-reckoning localization of a vehicle can comprise a non-transitory computer readable storage medium having program instructions embodied therewith, the program instructions executable by a processor to cause the processor to obtain, by the processor, plural sensor readings defining movement of a vehicle, wherein the plural sensor readings comprise an inertial sensor reading, a kinematics sensor reading, and an odometry sensor reading, and generate, by the processor, based on the plural sensor readings, a pose value defining a position of the vehicle relative to an environment in which the vehicle is disposed.

In one or more embodiments, the program instructions can be further executable by the processor to case the processor to combine, by the processor, the inertial sensor reading, kinematics sensor reading, and odometry sensor reading, and employ, by the processor, the combination of the sensor readings to generate the pose value defining the position of the vehicle.

An advantage of the device, system, computer-implemented method and/or computer program product discussed above can be a lightweight pose estimation process that can be employed rapidly relative to unforeseen, emergency and/or otherwise unintended changes in movement vehicle. That is, the estimation process can be performed to provide accurate measurements at real time.

Another advantage of the device, system, computer-implemented method and/or computer program product discussed above can be a provision of a global pose estimation, where the provision can comprise low memory consumption, restricted data vectors and/or reduced computation, such as compared to conventional approaches.

Another advantage of the device, system, computer-implemented method and/or computer program product discussed above can be rapid provision of a recommendation or control for movement of the vehicle, such as where the vehicle is already in motion. That is, a heavyweight estimation process cannot quickly provide the data necessary to allow a rapid provision of a recommendation or control for movement (e.g., maneuver, motion planning, and/or the like) of a vehicle, particularly relative to heavyweight external-sensor-based estimation.

Another advantage of the device, system, computer-implemented method and/or computer program product discussed above can be ability to provide such pose estimation upon signal loss (e.g., WiFi or other signal), external sensor failure, and/or external sensor obfuscation, such as due to weather.

Yet another advantage of the device, system, computer-implemented method and/or computer program product discussed above can be employment of an artificial intelligence (AI) model, neural network (NN), machine learning (ML) model and/or deep learning (DL) model to generate measurements from sensor readings defining movement of a vehicle and/or to adjust one or more sensor readings and/or measurements determined therefrom relative to one another based on observed noise. The noise can comprise variance and/or error attributable to system noise, weather and/or the like. The separate measurements, and thus the separate sensor readings from which the measurements are generated, can be combined and/or fused to provide an accurate and efficient global pose estimation of the vehicle, whether stationary or moving.

DESCRIPTION OF THE DRAWINGS

One or more exemplary embodiments are described below in the Detailed Description section with reference to the following drawings.

DETAILED DESCRIPTION

Figure 1:
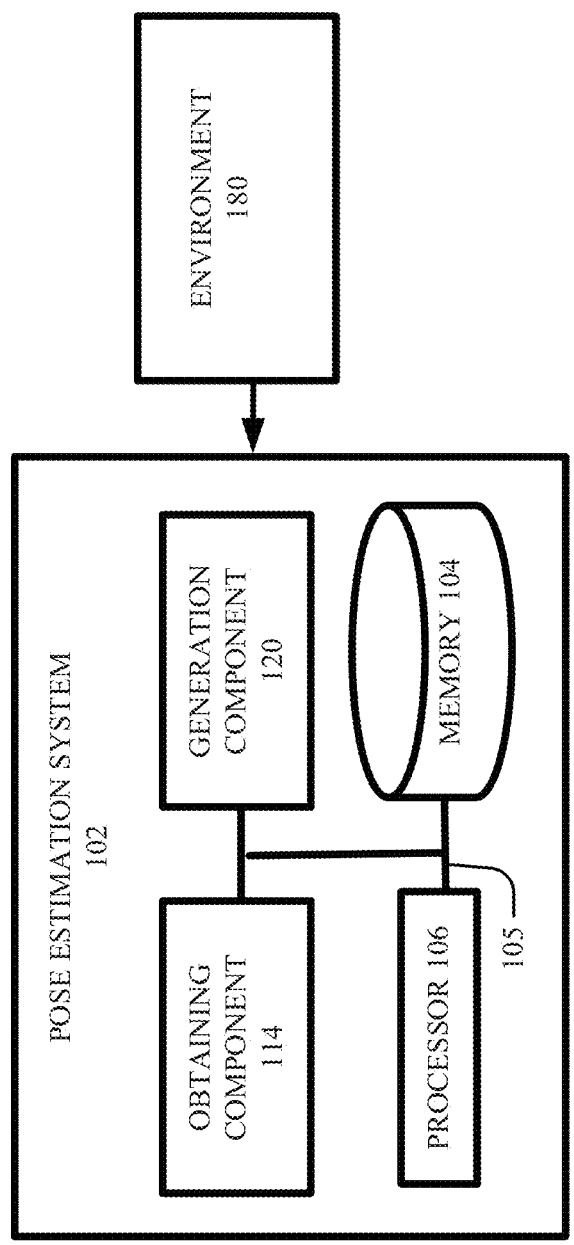
FIG. 1 illustrates a block diagram of a pose estimation system that can enable a process to determine dead-reckoning localization of a vehicle, in accordance with one or more embodiments described herein.

The following detailed description is merely illustrative and is not intended to limit embodiments and/or application or uses of embodiments. Furthermore, there is no intention to be bound by any expressed and/or implied information presented in the preceding Background and/or Summary sections, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it will be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting.

As used herein, the terms "entity", "requesting entity" and "user entity" can refer to a machine, device, component, hardware, software, smart device and/or human.

As used herein, "data" can comprise metadata.

As used herein, "use" can comprise access to.

As used herein, "cost" can refer to time, money, power, storage, memory, bandwidth, manual labor and/or the like.

While one or more devices and/or systems are described below with reference to a wheeled vehicle, such as an automobile, the one or more embodiments described herein are not limited to this use. Further, while one or more devices and/or systems are described below with reference to a driving vehicle capable of at least partial autonomous driving, the one or more embodiments described herein also can be applicable to use in non-autonomous cases and/or with non-autonomous vehicles, objects and/or the like. A pose estimation system described herein can be implemented in any suitable electronic driving, control and/or navigation system such as, for instance, at an electric vehicle (EV). Indeed, the one or more devices and/or systems described herein can be utilized with any of a military vehicle, marine vehicle such as a boat or marine drone, winged vehicle such as a plane, and/or rotor-ed vehicle such as a helicopter or drone. Likewise, usage can extend to a robot and/or any suitable moving device. In one or more embodiments, odometry sensor readings can be replaced by another sensor reading, such as a propeller sensor reading.

Turning now to the figures, one or more embodiments described herein can include one or more devices, systems, apparatuses and/or system-implemented methods that can provide a process to determine dead-reckoning localization of a vehicle, such as a moving vehicle. Generally, the one or more embodiments can provide an efficient, reliable and reactive pose representation for a vehicle, such as for autonomous braking in low-speed maneuvers, such as parking.

Generally, a pose estimation system as described herein can employ raw data (e.g., data and/or metadata) from one or more sensors at an object. The raw data, also herein referred to as sensor readings, can be converted to raw measurements, also herein referred to only as measurements, which can be employed by an innovative framework described herein to define a pose of a vehicle, such as relative to one or more maps, locations and/or environments.

The framework generally can comprise generation of three stages of models based on combination of different measurements from separate sensor readings from separate sensor types. The models and measurements can be generated from raw sensor readings, such as from one or more of each of inertial sensors, kinematic sensors, and odometry sensors (e.g., wheel odometry sensors or other rotating member odometry sensors). These models (and/or the measurements defining these models) can be combined to provide sufficient and accurate information to rapidly, such as in real time, define a pose of a stationary or moving vehicle. The pose, also herein referred to as a virtual pose, can be represented virtually, whether or not such pose is presented visually (e.g., in an image via an imaging device, screen and/or the like) to a user entity.

The separate sets of measurements can be adjusted to account for system noise, error, and/or noisy data (e.g., due to weather, visibility and/or the like) and fused together. The fusion can employ additional data from one or more auxiliary sensors of the vehicle, such as sensors not comprising inertial, kinematics and/or odometry sensors, and/or data from one or more previous pose estimations. An output can be a global pose estimation of the vehicle, which output can be employed as historical data for a subsequent iteration of the pose estimation framework.

In one or more embodiments, an analytical model, such as an AI model, NN, ML model and/or DN model, can be employed to generate the global pose estimation. Generally, an analytical model can be employed for generating measurements from sensor readings, and/or for adjusting the measurements and/or sensor readings relative to one another, such as indicated above to account for system noise, error, and/or noisy data. In one or more embodiments, separate AI models, such as deep neural networks (DNNs) can be employed for each of these processes. By learning and continually updating recognition of sensor readings, such as relation of different sensor readings of different types, accuracy to complete pose estimation generation can be increased and/or time to complete pose estimation generation can be reduced. Furthermore, data and/or generated measurements from previous iterations of pose estimation can be employed to train the one or more analytical models at any suitable frequency.

Looking first to FIG. 1, a non-limiting system 100 is illustrated that can comprise one or more devices, systems, and/or apparatuses that can provide a process to determine dead-reckoning localization of a vehicle, such as a moving vehicle, in accordance with one or more embodiments described herein. While referring here to one or more processes, facilitations, and/or uses of the non-limiting system 100, description provided herein, both above and below, also can be relevant to one or more other non-limiting systems described herein, such as the non-limiting system 200, to be described below in detail.

The non-limiting system 100 can provide both a process to obtain sensor readings and to employ a combination of sensor readings to generate a pose value defining a pose estimation of a vehicle. As illustrated, the non-limiting system 100 can comprise a pose estimation system 102 comprising a processor 106, memory 104, bus 105, obtaining component 114, and generation component 120. Generally, the obtaining component 114 can obtain plural sensor readings defining movement of a vehicle, wherein the plural sensor readings comprise an inertial sensor reading, a kinematics sensor reading, and an odometry sensor reading.

Generally, the generation component 120 can, based on the plural sensor readings, generate a pose value defining a position of the vehicle relative to an environment in which the vehicle is disposed.

In one or more embodiments, the vehicle can comprise the pose estimation system 102. In one or more other embodiments, the pose estimation system 102 can be at least partially separate from the vehicle but can obtain sensor readings from one or more sensors at the vehicle.

One or more aspects of a component (e.g., the obtaining component 114 and/or generation component 120) can be employed separately and/or in combination, such as employing one or more of the memory 104 or the processor 106. Additionally, and/or alternatively, the processor 106 can execute one or more program instructions to cause the processor 106 to perform one or more operations by these components. The bus 105 can provide local communication between the elements of the pose estimation system 102.

Figure 2:
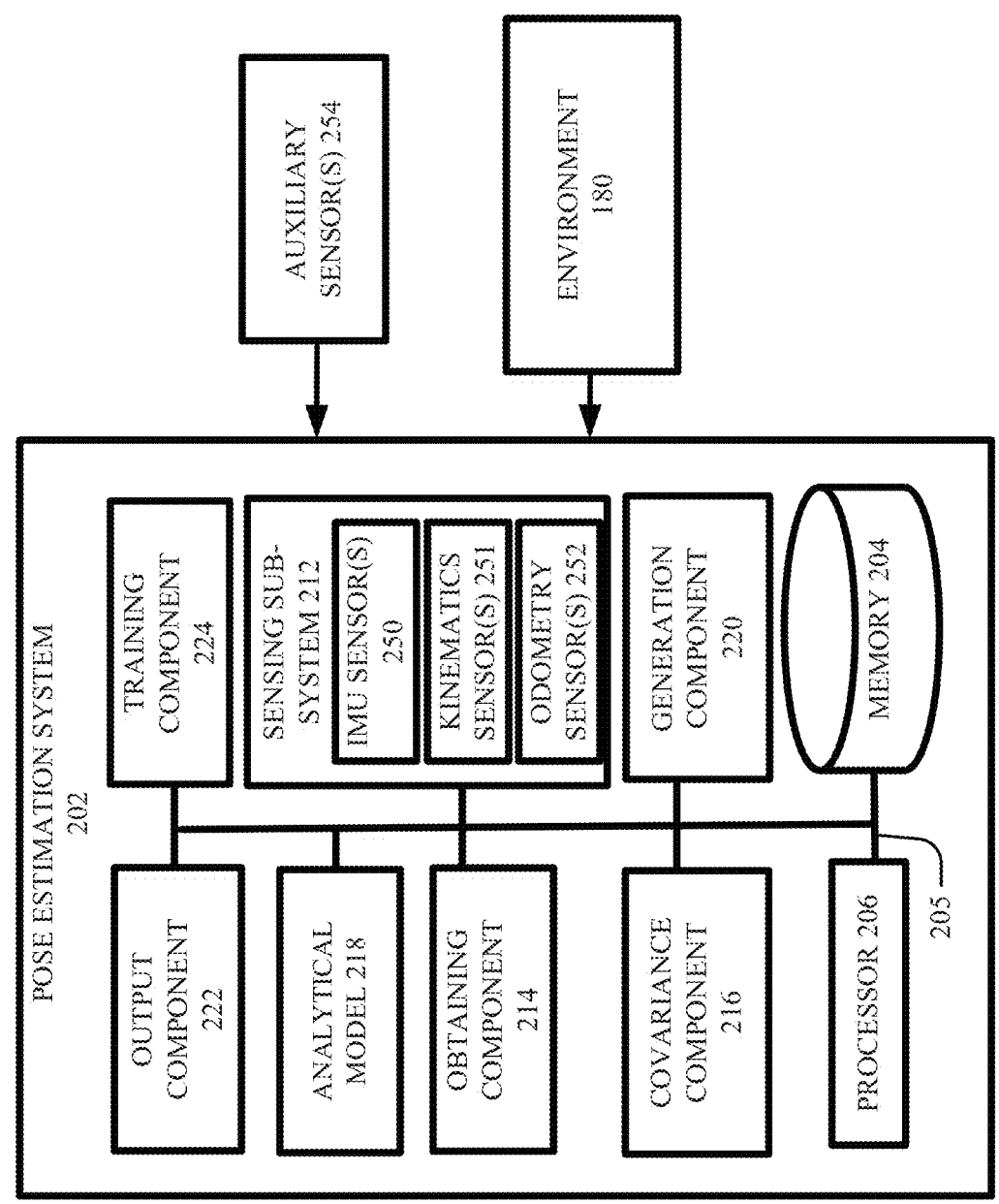
FIG. 2 illustrates a block diagram of another pose estimation system that can enable a process to determine dead-reckoning localization of a vehicle, in accordance with one or more embodiments described herein.

Turning next to FIG. 2, a non-limiting system 200 is depicted. One or more embodiments of the non-limiting system 200 described herein can include one or more devices, systems and/or apparatuses that can provide a process to determine dead-reckoning localization of a vehicle, such as a moving vehicle, in accordance with one or more embodiments described herein. Repetitive description of like elements and/or processes employed in respective embodiments is omitted for the sake of brevity. While referring here to one or more processes, facilitations, and/or uses of the non-limiting system 200, description provided herein, both above and below, also can be relevant to one or more non-limiting systems or elements of other non-limiting systems described herein, such as the non-limiting system 100.

The non-limiting system 200 can comprise a pose estimation system 202 that can provide a process to determine a dead-reckoning localization of a vehicle. Generally, the pose estimation system 202 can provide both a process to obtain sensor readings and to employ a combination of sensor readings to generate a pose value defining a pose estimation of a vehicle. Accordingly, when the vehicle, such as an autonomously moving vehicle, encounters an emergency, unforeseen and/or unintended situation, such as where a low-speed emergency braking operation can be employed, sufficient, adequate and/or accurate data can be available to determine localized pose estimation (also herein referred to as a global pose estimation) defining position of an object in an environment 180.

Figure 3:
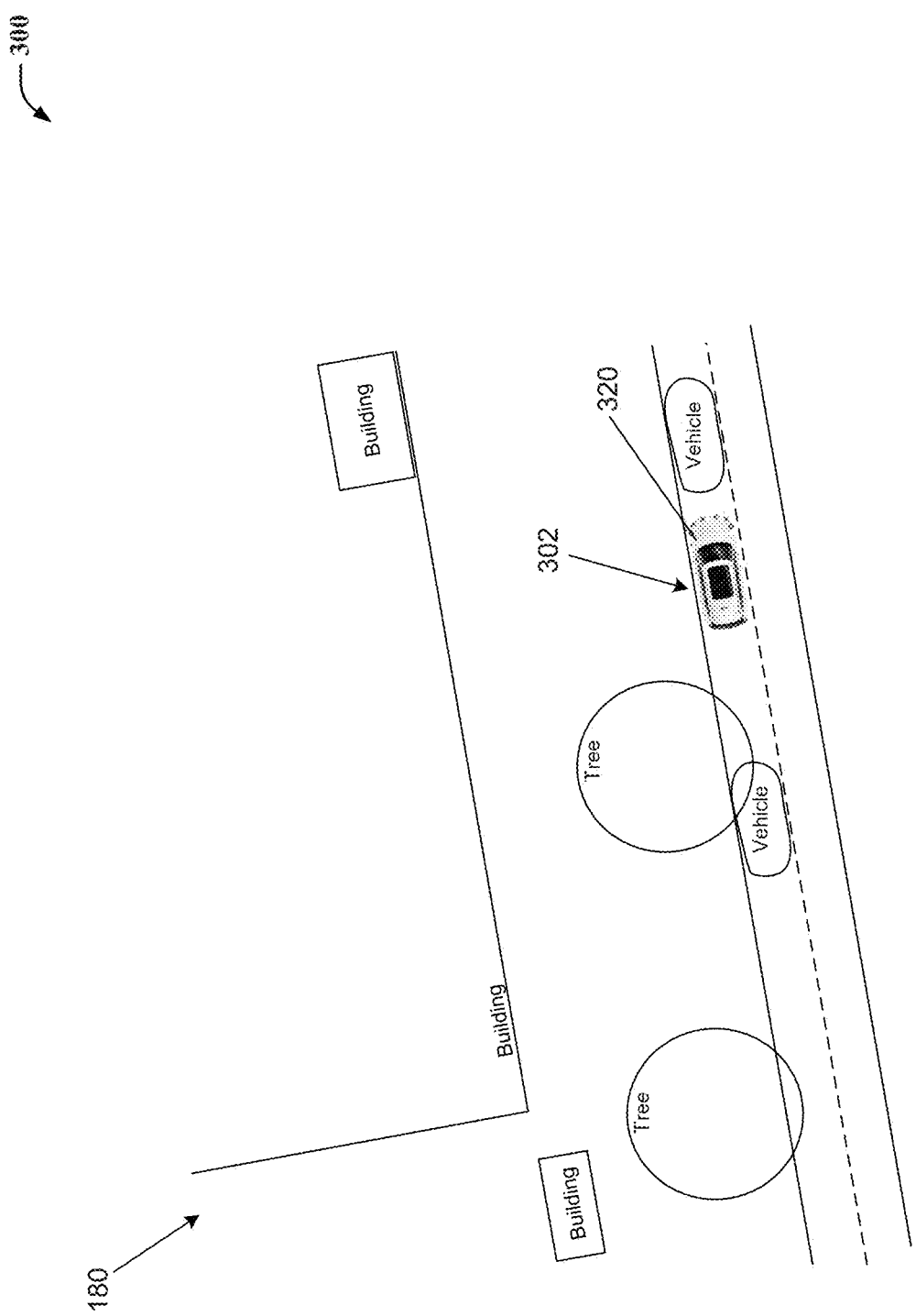
FIG. 3 provides a representation of pose estimation as can be enabled by the pose estimation system of FIG. 2, in accordance with one or more embodiments described herein.

For example, looking only briefly to FIG. 3, a pose 302 of a vehicle 320 relative to an environment 180 can be virtually generated and/or visually generated. The environment 180 can be represented, virtually and/or visually, by any current or historical representation available to the pose estimation system 202, whether virtual, visual and/or otherwise.

Generally, to allow for quick provision of accurate data, without over-computation, large memory consumption, and/or heavy-weight localization generation, a lightweight pose estimation framework can be employed. This lightweight framework can generally comprise generation and noise adjustment of measurements for varying models, such as inertial, bicycle and odometry models. Sensor readings, measurements based on the sensor readings and defining these models, and/or the models themselves, can be fused together to provide a more accurate representation of a localized vehicle pose, than from any one or more of the inertial sensors, kinematics sensors and/or odometry sensors alone. The measurements further can be modified by (e.g., supplemented by) auxiliary sensor data other than inertial, kinematics and odometry sensor data. The measurement generations (e.g., from the sensor data) and noise adjustment each can be enabled and/or provided by an analytical model.

The pose estimation system 202, as illustrated, can comprise any suitable type of component, machine, device, facility, apparatus, and/or instrument that comprises a processor and/or can be capable of effective and/or operative communication with a wired and/or wireless network. All such embodiments are envisioned. For example, the pose estimation system 202 can comprise a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players, and/or another type of device and/or computing device. Likewise, the pose estimation system 202 can be disposed and/or run at any suitable device, such as, but not limited to a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players, and/or another type of device and/or computing device.

The pose estimation system 202 can be associated with, such as accessible via, a cloud computing environment. For example, the pose estimation system 202 can be associated with a cloud computing environment 1102 described below with reference to illustration 1100 of FIG. 11.

Operation of the non-limiting system 200 and/or of the pose estimation system 202 is not limited to generation of a single pose model (e.g., inertial model, bicycle model or odometry model), model fusion and/or pose estimation. Rather, operation of the non-limiting system 200 and/or of the pose estimation system 202 can be scalable. For example, the non-limiting system 200 and/or the pose estimation system 202 can provide plural process executions of one or more of the above-listed types at least partially in parallel with one another.

In one or more embodiments, the vehicle can comprise the pose estimation system 202. In one or more other embodiments, the pose estimation system 202 can be separate from the vehicle but can obtain sensor readings from one or more sensors at the vehicle.

As illustrated the pose estimation system 202 can comprise a sensing sub-system 212 comprising one or more inertial sensor 250, one or more kinematics sensor 251, and one or more odometry sensor 252, an obtaining component 214, a covariance component 216, a generation component 220, an output component 222, a training component 224, analytical model 218, a processor 206, a memory 204, and/or a bus 205.

One or more communications between one or more components of the non-limiting system 200 and/or pose estimation system 202 can be provided by wired and/or wireless means including, but not limited to, employing a cellular network, a wide area network (WAN) (e.g., the Internet), and/or a local area network (LAN). Suitable wired or wireless technologies for enabling the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol, and/or other proprietary and/or non-proprietary communication protocols.

Discussion now turns to the processor 206, memory 204 and bus 205 of the pose estimation system 202.

For example, in one or more embodiments, the pose estimation system 202 can comprise a processor 206 (e.g., computer processing unit, microprocessor, classical processor, and/or like processor). In one or more embodiments, a component associated with the pose estimation system 202, as described herein with or without reference to the one or more figures of the one or more embodiments, can comprise one or more computer and/or machine readable, writable, and/or executable components and/or instructions that can be executed by processor 206 to enable performance of one or more processes defined by such component(s) and/or instruction(s). In one or more embodiments, the processor 206 can comprise the sensing sub-system 212, obtaining component 214, covariance component 216, generation component 220, output component 222, training component 224 and/or analytical model 218.

In one or more embodiments, the pose estimation system 202 can comprise a computer-readable memory 204 that can be operably connected to the processor 206. The memory 204 can store computer-executable instructions that, upon execution by the processor 206, can cause the processor 206 and/or one or more other components of the pose estimation system 202 (e.g., the sensing sub-system 212, obtaining component 214, covariance component 216, generation component 220, output component 222, training component 224 and/or analytical model 218) to perform one or more actions. In one or more embodiments, the memory 204 can store computer-executable components (e.g., the sensing sub-system 212, obtaining component 214, covariance component 216, generation component 220, output component 222, training component 224 and/or analytical model 218).

The pose estimation system 202 and/or a component thereof as described herein, can be communicatively, electrically, operatively, optically, and/or otherwise coupled to one another via a bus 205 to perform functions of non-limiting system 420, pose estimation system 202 and/or one or more components thereof and/or coupled therewith. Bus 205 can comprise one or more of a memory bus, memory controller, peripheral bus, external bus, local bus, and/or another type of bus that can employ one or more bus architectures. One or more of these examples of bus 205 can be employed to implement one or more embodiments described herein.

In one or more embodiments, pose estimation system 202 can be coupled (e.g., communicatively, electrically, operatively, optically, and/or like function) to one or more external systems (e.g., a non-illustrated electrical output production system, one or more output targets, an output target controller, and/or the like), sources and/or devices (e.g., computing devices, communication devices, and/or like devices), such as via a network. In one or more embodiments, one or more of the components of the pose estimation system 202 can reside in the cloud, and/or can reside locally in a local computing environment (e.g., at a specified location(s)).

It is noted that in one or more embodiments, a portion or more of the sensing sub-system 212 and/or one or more analytical models 218 can be separate from, and thus external to, the pose estimation system 202. In one or more embodiments, the auxiliary sensor(s) 254 can be comprised by the pose estimation system 202.

In addition to the processor 206 and/or memory 204 described above, pose estimation system 202 can comprise one or more computer and/or machine readable, writable, and/or executable components and/or instructions that, when executed by processor 206, can enable performance of one or more operations defined by such component(s) and/or instruction(s).

Turning now first to the sensing sub-system 212, one or more sensors can be comprised by the pose estimation system 202. For example, the sensing sub-system 212 can comprise one or more inertial measurement sensors 250, one or more kinematics sensors 251, and/or one or more odometry sensors 252. An inertial measurement sensor 250 can comprise an inertial measurement unit (IMU) and/or other suitable sensor. A kinematics sensor 251 can comprise a car speed sensor and/or a pinon angle sensor. An odometry sensor 252 can comprise a wheel speed sensor.

Relative to the vehicle, the one or more inertial measurement sensors 250, one or more kinematics sensors 251, and/or one or more odometry sensors 252 can be located at any suitable location on the vehicle. Any suitable number of inertial measurement sensors 250, kinematics sensors 251, and/or odometry sensors 252 can be employed at a vehicle to provide sensing of vehicle movement variables.

In one or more other embodiments, any one or more of the inertial measurement sensors 250, kinematics sensors 251, and/or odometry sensors 252 can be separate from, such as external to, the pose estimation system 202.

Referring still to FIG. 2 any suitable number of auxiliary sensors 254 can be comprised by the object. The auxiliary sensors can comprise weather, moisture, precipitation, and/or GPS. One or more of these sensors can output data and/or measurement(s) about a property/variable of movement or environment of the vehicle, which data and/or measurement(s) (e.g. auxiliary measurement) can be employed to generate a pose value defining a pose estimation.

In one or more other embodiments, any one or more of the auxiliary sensors 254 can be comprised by the pose estimation system 202.

Turning next to the obtaining component 210, the obtaining component 210 can locate, find, search, and/or otherwise obtain sensor readings such as raw sensor reading data for employment by the pose estimation system 202 in estimating the pose of the vehicle. For example, the obtaining component 210 can gather raw data from one or more inertial sensors 250, one or more kinematics sensors 251, one or more odometry sensors 252, and/or one or more auxiliary sensors 254.

In one or more embodiments, the obtaining component 210 can further gather a historical pose estimation, such as one previously output by the generation component 220, for use by the generation component 220 in generating a new pose estimation.

Figure 4:
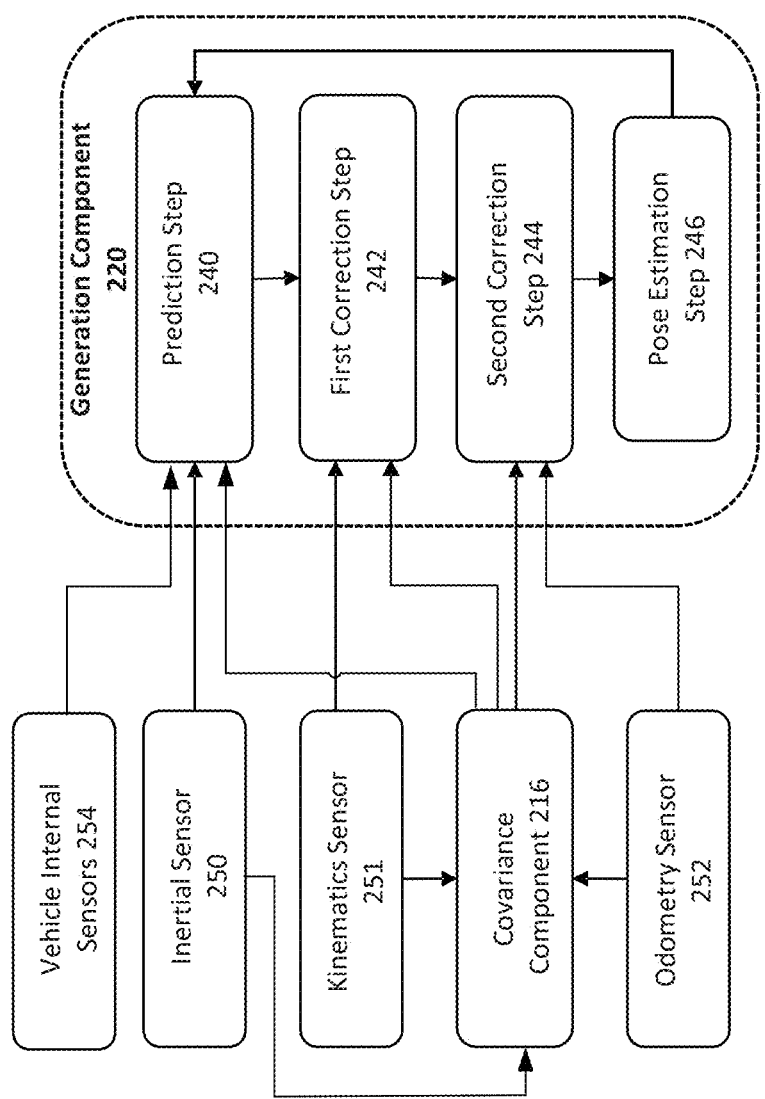
FIG. 4 provides an exemplary block diagram of one or more elements of and/or operations that can be performed by the pose estimation system of FIG. 2, in accordance with one or more embodiments described herein.
Figure 5:
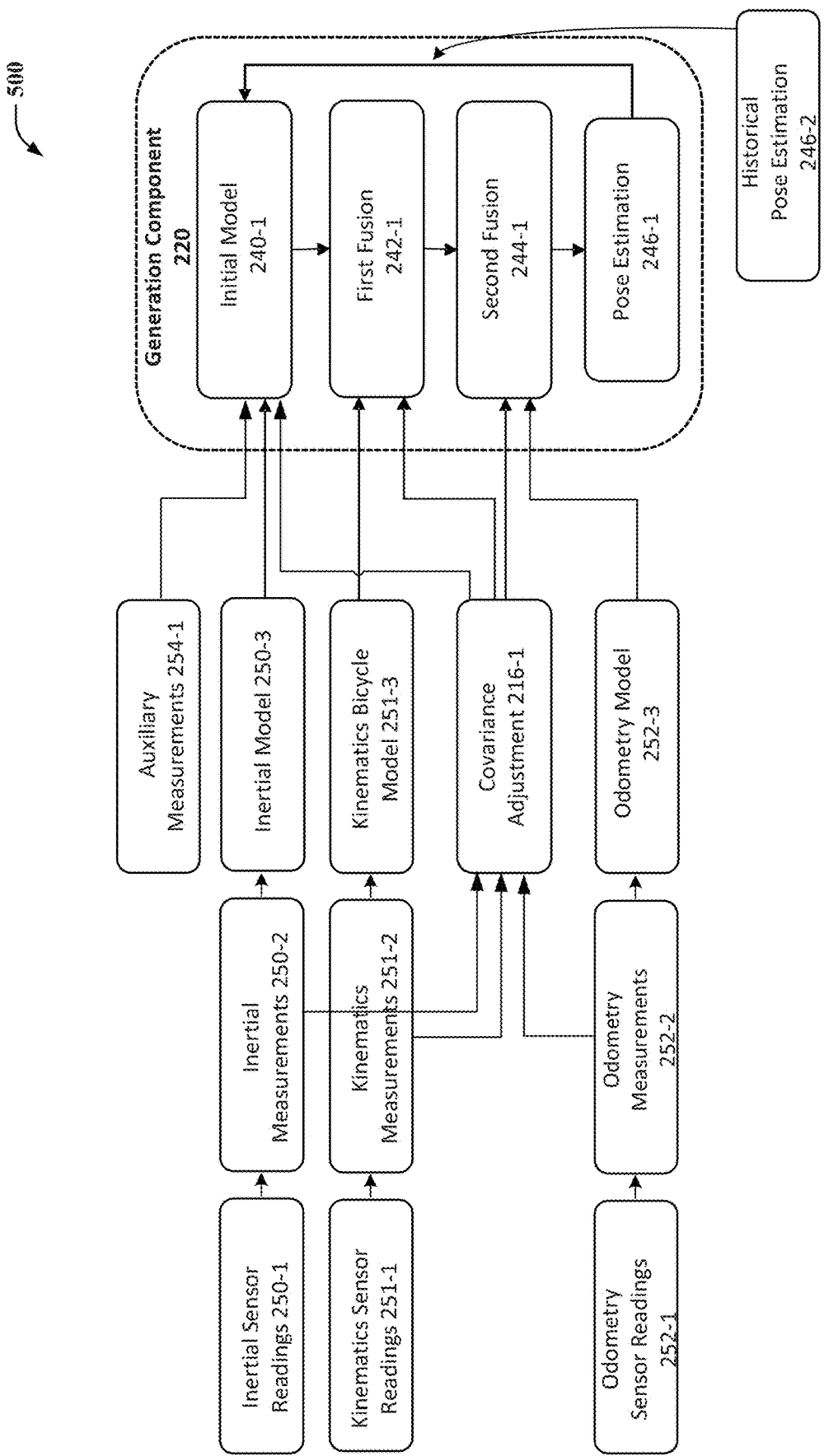
FIG. 5 provides an exemplary block diagram of one or more results and/or outputs relative to the one or more elements and/or operations illustrated at FIG. 6, in accordance with one or more embodiments described herein.

Attention now turns to FIGS. 4 and 5, in addition to FIG. 2. It is noted that description of the covariance component 216, analytical model 218, and generation component 220 will be provided below with additional reference also to FIGS. 4 and 5.

FIG. 4 illustrates an exemplary block diagram 400 of one or more elements of and/or operations that can be performed by the pose estimation system 202 of FIG. 2, in accordance with one or more embodiments described herein.

As illustrated, outputs of the one or more inertial sensors 250, one or more kinematics sensors 251, and/or one or more odometry sensors 252, can be input to and/or otherwise obtained by the covariance component 216. The covariance component 216 can generally be a dynamic noise covariance generator to adjust noise covariance values separately for inertial, kinematics and odometry sensors.

Also as illustrated, output of the covariance component 216, output of the one or more vehicle sensors 254, and output of the one or more inertial sensors 250, one or more kinematics sensors 251, and/or one or more odometry sensors 252 can be input and/or otherwise obtained by the generation component 220. The generation component 220 can generally perform one or more processes resulting in output of a pose value that can define a pose estimation. The one or more processes can comprise a prediction step 240, first correction step 242, second correction step 244, and pose estimation step 246.

The prediction step 240 can employ output from the vehicle internal sensors 254, inertial sensors 250, and covariance component 216. The first correction step 242 can employ output from the prediction step 240, kinematics sensors 251, and covariance component 216. The second correction step 244 can employ output from the first correction step 141, odometry sensor 252, and covariance component 216.

Figure 6:
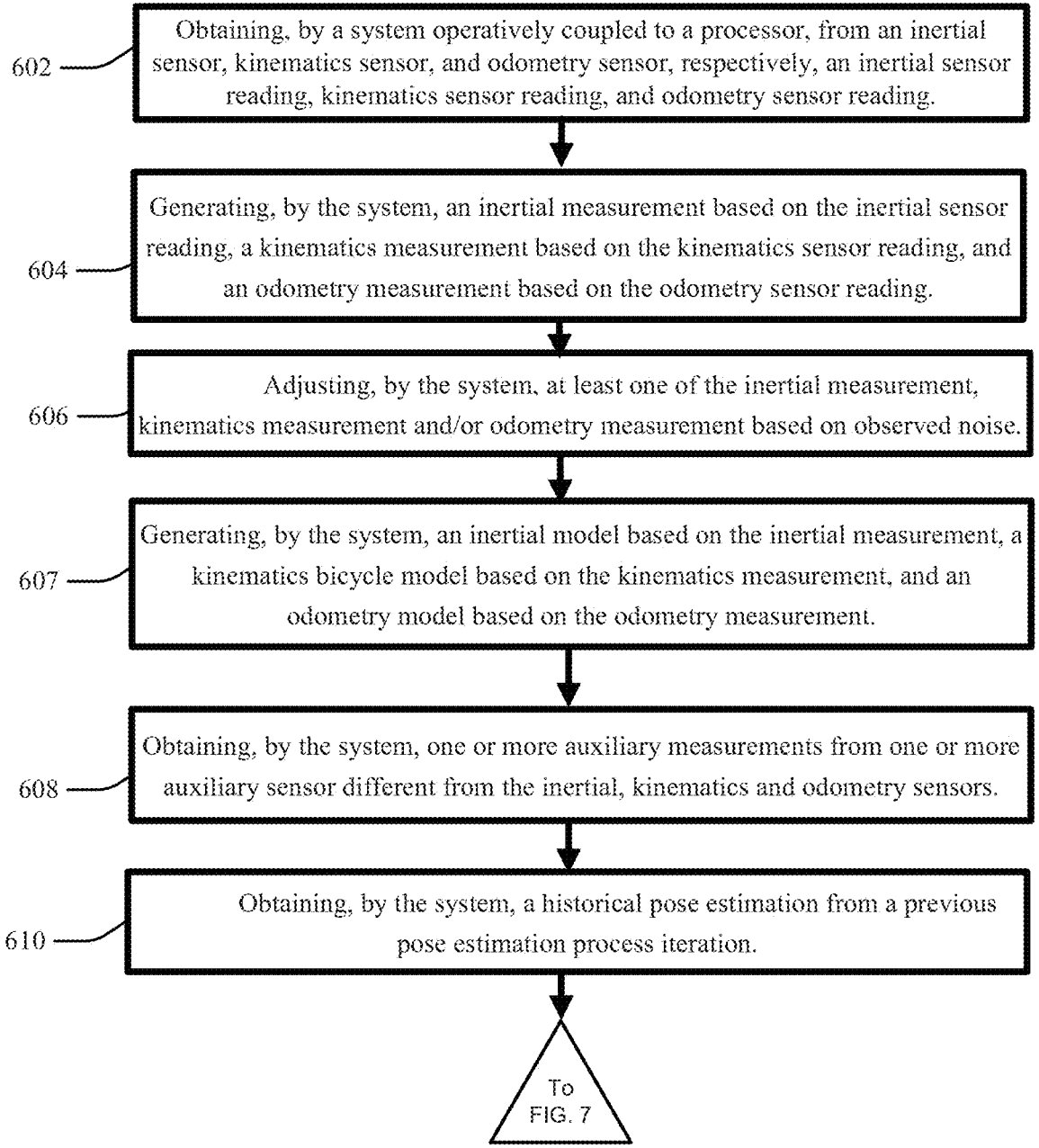
FIG. 6 illustrates a process flow of a method of determination of a global pose estimation, such as relative to the pose estimation system of FIG. 2 and the block diagrams of FIGS. 4 and 5, in accordance with one or more embodiments described herein.

Turning now to FIG. 5, illustrated is an exemplary block diagram of one or more results and/or outputs relative to the one or more elements and/or operations illustrated at FIG. 6, in accordance with one or more embodiments described herein.

The generation component 220 can employ the inertial sensor readings 250-1 to determine one or more inertial measurements 250-2, the kinematics sensor readings 251-1 to determine one or more kinematics measurements 251-2, and the odometry sensor readings 252-1 to determine one or more odometry measurements 252-2.

The inertial sensor readings 250-1 can comprise data related to lateral acceleration, longitudinal acceleration, vertical acceleration, angular velocity in roll, angular velocity in pitch, and/or angular velocity in yaw. Thus the inertial measurements 250-2 can comprise lateral acceleration, longitudinal acceleration, vertical acceleration, angular velocity in roll, angular velocity in pitch, and/or angular velocity in yaw values.

The kinematics sensor readings 251-1 can comprise data related to a lateral velocity, longitudinal velocity, and/or pinion angle. Thus the kinematics measurements 251-2 can comprise a lateral velocity, longitudinal velocity, and/or pinion angle.

The odometry sensor readings 252-1 can comprise data related to a rear left wheel speed and/or rear right wheel speed. Thus the odometry measurements 252-2 can comprise a rear left wheel speed and/or rear right wheel speed.

The determinations of the measurements can comprise conversion of raw data into measurements that can be employed to determine position of the vehicle. For example, the generation component 220 can leverage a hybrid motion model to calculate the vehicle pose based on sensor data. The hybrid motion model can be comprised by and/or separate from the generation component 220. The hybrid motion model can be coded as a software package and can be executed in the vehicle computing unit. The vehicle computing unit can access the raw sensor data from different sensors. When the sensor data updates, the hybrid motion model can provide an accurate pose estimation of the vehicle based on the sensor data. Within the hybrid motion model, the three different models—inertial model 250-3, kinematics bicycle model 251-3, and odometer model 252-3—can be provided as three different pose estimations. That is, the hybrid motion model can leverage a Kalman Filter with a dynamic noise covariance generator to fuse the pose estimation results from the above-mentioned three models to provide an accurate global pose estimation.

In one or more embodiments, these determinations can be enabled by an analytical model, such as the analytical model 218. The analytical model 218 can be, can comprise and/or can be comprised by a classical model, such as a predictive model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, semi-supervised and/or unsupervised. For example, the analytical model 218 can comprise a deep neural network (DNN).

Generally, the analytical model 218 can be trained, such as by the training component 224, on a set of training data that can represent the type of data for which the system will be used. That is, the analytical model 218 can be trained on transformations of raw sensor readings into measurements and/or into respective inertial, kinematics and/or odometry models.

Turning now to the covariance component 216, the covariance component 216 can generally adjust one or more of the plural measurements, such as the inertial measurements 250-2, kinematics measurements 252-2, and/or odometry measurements 252-2 relative to one another, such as based on observed noise. The noise can comprise system noise, noise caused by weather conditions, noise caused by environmental conditions and/or the like. The covariance component 216, in combination with the analytical model 218, can detect the noise.

That is, the analytical model 218 can be trained, such as by the training component 224, on a set of training data that can represent the type of data for which the system will be used. For example, the analytical model 218 can be trained on noise detection and classification data, measurements and/or the like.

After detection of the noise, the noise can be classified by the analytical model 218 and adjustment of the measurements 250-2, 252-2, and 252-2 can be performed. For example, a system of weighting can be employed by the analytical model 218, such as based on severity of system noise, weather noise and/or other noise. In order to enable a robust pose estimation, the one or more measurements 250-2, 252-2, and 252-2 can be adjusted to have less or more significance to a pose value estimation or to the overall pose estimation.

In one or more embodiments, weights can be based on historical information and/or weather information. In one or more additional and/or alternative embodiments, weights can be based on broken or malfunctioning sensor state, or even on weather-based sensor failure. For example, snow, fog and/or heavy rain can limit accurate measurements of a sensor of the sensing sub-system 212.

In one or more embodiments, the weights can be decided dynamically by the covariance component 216 at run time, such as based on the current and previous measurements.

Turning now again to further function of the generation component 220, as noted above, one or more outputs of auxiliary vehicle internal sensors 254, inertial sensors 250, kinematics sensors 252, odometry sensors 252, and the covariance component 216 can be input to and/or otherwise obtained by the generation component 220. That is, the weighted measurements 250-2, 252-2 and 252-2 can be input to and/or otherwise obtained by the generation component 220.

The generation component 220 can generally be provided by and/or comprise, at least partially, a filter, such as a Kalman filter or sequential Kalman filter. A sequential Kalman Filter can be configured, such as designed, to fuse measurements from different sensor types for each fusion cycle (e.g., iteration of use of the pose estimation system 202 and/or iteration of provision of a pose estimation 246-1).

Generally, the generation component 220 can, based on the measurements 250-2, 252-2 and 252-2, generate a pose value defining a position of the vehicle relative to an environment 180 in which the vehicle is disposed. That is, the generation component 220 can perform one or more processes to generate the pose estimation 246-1 (e.g., comprising one or more pose values) from the weighted measurements 250-2, 252-2 and 252-2, and from the auxiliary measurements 254-1 and/or historical pose estimation 246-2.

As indicated above relative to FIG. 5, the generation component 220 can perform a prediction step 240, first correction step 242, second correction step 244 and pose estimation step 246. In one or more embodiments, the prediction step 240 and correction steps 242 and 244 can be performed in a different order, such as a different sequential order.

For the prediction step 240, the inertial model 250-3 (e.g., the inertial measurements 250-2 and/or inertial sensor readings 250-1) that have been adjusted via the covariance adjustment 216-1 performed by the covariance component 216, the vehicle internal sensor readings (e.g., auxiliary measurement data 254-1), and the fused pose estimation from the previous cycle (e.g., historical pose estimation 246-2) can be fed to an initial module, where an initial model 240-1 can be generated by the generation component 220. The previously fused pose estimation information (e.g., historical pose estimation 246-2) can be projected to the current cycle based on the vehicle movements (e.g., auxiliary measurement data 254-1).

Next, at the first correction step 242, a first fusion 242-1 can be generated by the generation component 220. The first fusion 242-1 generation can comprise fusing of the initial model 240-1 result with the kinematics bicycle model 252-3 (e.g., the kinematics measurements 252-2 and/or kinematics sensor readings 251-2) that have been adjusted via the covariance adjustment 216-1 performed by the covariance component 216.

Next at a second correction step 244, a second fusion 244-1 can be generated by the generation component 220. The second fusion 242-1 generation can comprise fusing of the first fusion 242-1 result with the odometry model 252-3 (e.g., the odometry measurements 252-2 and/or odometry sensor readings 252-1) that have been adjusted via the covariance adjustment 216-1 performed by the covariance component 216.

In one or more embodiments, the first fusion 242-1, the second fusion 244-1 and the initial model 240-1 can be generated in a different order, such as a sequential order.

Next at a pose estimation step 246, the pose estimation 246-1 can be provided from the second fusion 244-1. The pose estimation from the Kalman Filter can be output as the overall estimated pose of the car, such as relative to the environment 180.

In one or more embodiments, the result of the second fusion 244-1 can be further processed to achieve the pose estimation 246-1. In one or more embodiments, the result of the second fusion 244-1 can be the pose estimation 246-1.

Referring now again to FIG. 2, after generation of the pose estimation 246-1 by the generation component 220, the output component 222 can recommend a movement value to control movement of the vehicle based on the pose estimation 246-1. Alternatively, the output component 222 can control movement of the vehicle based on one or more pose values defining the pose estimation 246-1. For example, the output component 222 can transmit the pose estimation 246-1 to a controller of vehicle movement, such as a decision making module, control module, and/or trajectory planning module for autonomous driving, thereby controlling movement of the vehicle by defining pose of the vehicle. Based on the output of the pose estimation system 202, motion planning and/or a maneuver can be better executed than based on conventional processes and/or operations.

Referring still to FIG. 2, in one or more embodiments, the pose estimation system 202 can comprise a training component 224. The training component 224 can train one or more of the analytical models 218 based on various data/access/use/behavior associated with the sensing sub-system 212 and/or covariance component 216, such as based on historical data defining noise, obstacles, environmental aspects and/or the like. In one or more cases, such historical data can be stored at the memory 204 and/or at any other suitable store internal to and/or external to the pose estimation system 202. The training component 224 can execute the training at any suitable frequency, such as after each pose estimation process iteration, based on a selected timing, and/or on-demand.

Turning now to the next figure not yet discussed, to FIG. 6, illustrated is a flow diagram of an example, non-limiting computer-implemented method 600 that can enable a process to determine dead-reckoning localization of a vehicle, such as a moving vehicle, in accordance with one or more embodiments described herein. While the computer-implemented method 600 is described herein relative to the pose estimation system 202 of FIG. 2, and relative to the block diagrams 400 and 500, the computer-implemented method 600 likewise can be applicable to other embodiments, such as illustrated at FIG. 1. Repetitive description of like elements employed in one or more other embodiments described herein is omitted for sake of brevity.

At 602, the computer-implemented method 600 can comprise obtaining, by a system operatively coupled to a processor (e.g., obtaining component 214), from an inertial sensor (e.g., inertial sensor 250), kinematics sensor (e.g., kinematics sensor 251), and odometry sensor (e.g., odometry sensor 252), respectively, an inertial sensor reading (e.g., inertial sensor reading 250-1), a kinematics sensor reading (e.g., kinematics sensor reading 251-1), and odometry sensor reading (e.g., odometry sensor reading 252-1).

At 604, the computer-implemented method 600 can comprise generating, by the system (e.g., generation component 220), an inertial measurement (e.g., inertial measurement 250-2) based on the inertial sensor reading, a kinematics measurement (e.g., kinematics measurements 251-2) based on the kinematics sensor reading, and an odometry measurement (e.g., odometry measurement 252-2) based on the odometry sensor reading.

At 606, the computer-implemented method 600 can comprise adjusting, by the system (e.g., covariance component 216), at least one of the inertial measurement, kinematics measurement and/or odometry measurement based on observed noise.

At 607, the computer implemented method 600 can comprise generating, by the system (e.g., generation component 220) an inertial model (e.g., inertial model 250-3) based on the inertial measurement, a kinematics model (e.g., kinematics bicycle model 251-3) based on the kinematics measurement, and an odometry model (e.g., odometry model 252-3) based on the odometry measurement.

At 608, the computer-implemented method 600 can comprise obtaining, by the system (e.g., obtaining component 214), one or more auxiliary measurements (e.g., auxiliary measurement 254-1) from one or more auxiliary sensors (e.g., auxiliary sensors 254) different from the inertial, kinematics and odometry sensors.

At 610, the computer-implemented method 600 can comprise obtaining, by the system (e.g., obtaining component 214), a historical pose estimation (e.g., historical pose estimation 246-2) from a previous pose estimation process iteration.

Figure 7:
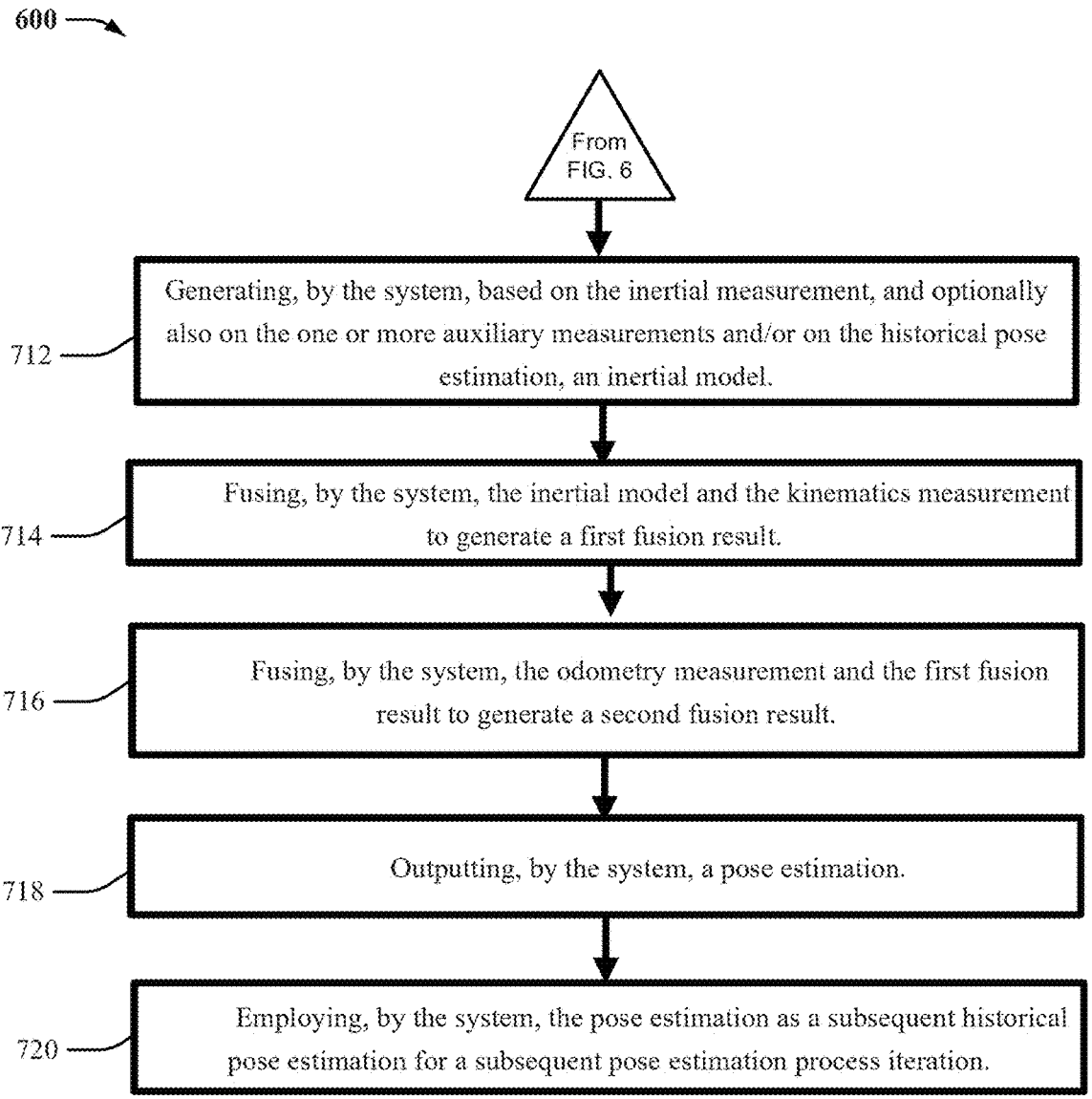
FIG. 7 illustrates a continuation of the process flow of FIG. 6, in accordance with one or more embodiments described herein.

The computer-implemented method 600 continues at FIG. 7.

At 712 the computer-implemented method 600 can comprise generating, by the system (e.g., generation component 220), based on the inertial measurement (e.g., inertial measurement 250-2), and optionally also on the one or more auxiliary measurements (e.g., auxiliary measurements 254-1) and/or on the historical pose estimation (e.g., historical pose estimation 246-2), an inertial model (e.g., initial model 240-1). Put another way, the initial model (e.g., initial model 240-1) can be based on the inertial model (e.g., inertial model 250-3) which itself is based on the inertial measurement (e.g., inertial measurement 250-2).

At 714, the computer-implemented method 600 can comprise fusing, by the system (e.g., generation component 220), the inertial model and the kinematics measurement (e.g., kinematics measurement 251-2) to generate a first fusion result (e.g., first fusion 242-1), such as a combined inertial and bicycle model. Put another way, the first fusion result (e.g., first fusion result 242-1) can be based on the kinematics model (e.g., kinematics bicycle model 251-3) which itself is based on the kinematics measurement (e.g., kinematics measurement 251-2).

At 716, the computer-implemented method 600 can comprise fusing, by the system (e.g., generation component 220), the odometry measurement (e.g., odometry measurement 252-2) and the first fusion result to generate a second fusion result (e.g., second fusion 246-1), such as a combined inertial, bicycle and odometry model. Put another way, the second fusion result (e.g., second fusion result 244-1) can be based on the odometry model (e.g., odometry model 252-3) which itself is based on the odometry measurement (e.g., odometry measurement 252-2).

At 718, the computer-implemented method 600 can comprise outputting, by the system (e.g., output component 222), a pose estimation (e.g., pose estimation 246-1).

At 720, the computer-implemented method 600 can comprise employing, by the system (e.g., generation component 220), the pose estimation (e.g., pose estimation 246-1) as a subsequent historical pose estimation (e.g., historical pose estimation 246-2) for a subsequent pose estimation process iteration.

Figure 8:
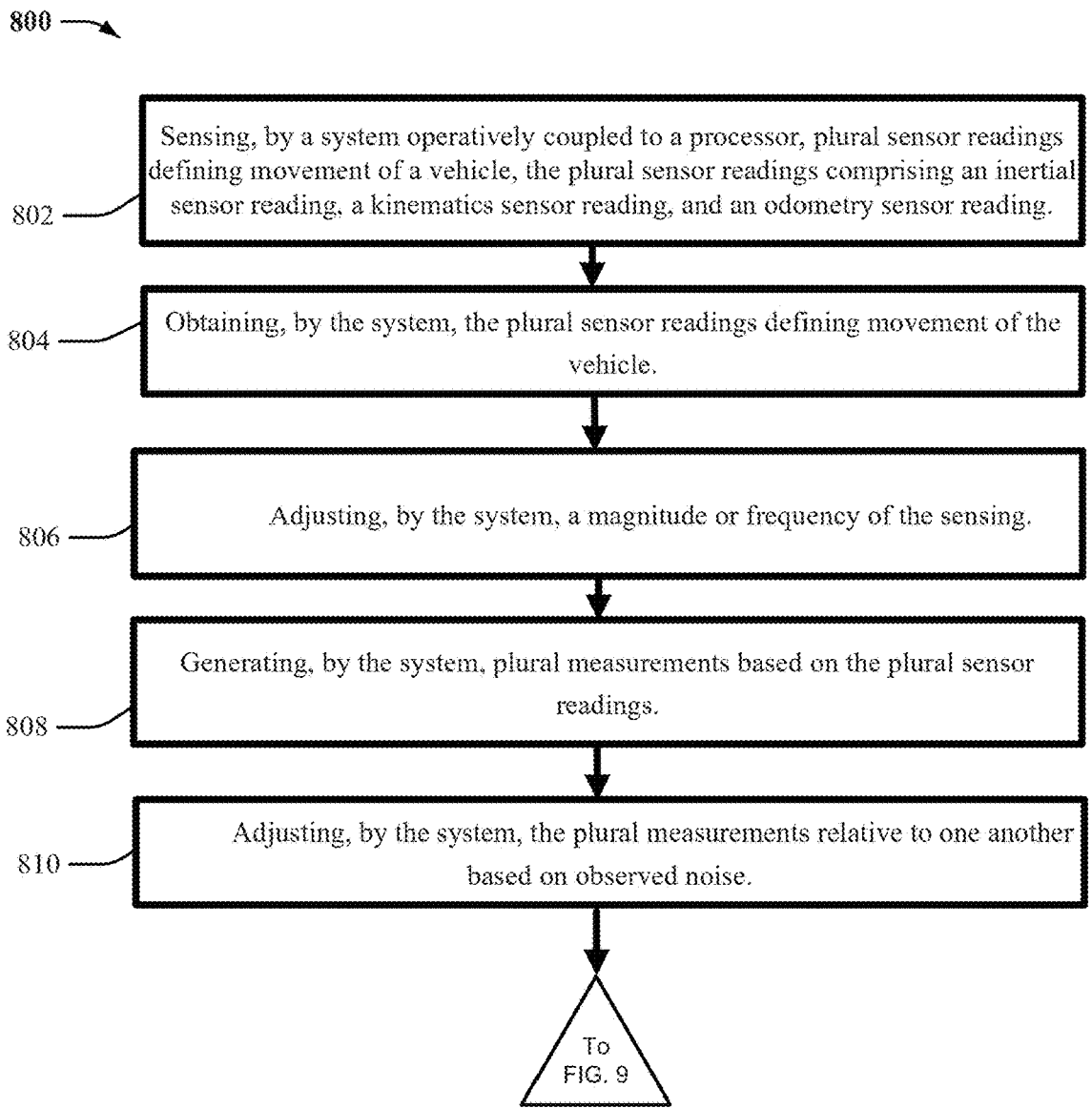
FIG. 8 illustrates another process flow of a method of determination of a global pose estimation, such as relative to the pose estimation system of FIG. 2, in accordance with one or more embodiments described herein.

Turning now to FIG. 8, illustrated is a flow diagram of an example, non-limiting computer-implemented method 800 that can enable a process to determine dead-reckoning localization of a vehicle, such as a moving vehicle, in accordance with one or more embodiments described herein. While the computer-implemented method 800 is described herein relative to the pose estimation system 202 of FIG. 2, and relative to the block diagrams 400 and 500, the computer-implemented method 800 likewise can be applicable to other embodiments, such as illustrated at FIG. 1. Repetitive description of like elements employed in one or more other embodiments described herein is omitted for sake of brevity.

At 802, the computer-implemented method 800 can comprise sensing, by a system operatively coupled to a processor (e.g., sensing sub-system 212), plural sensor readings defining movement of a vehicle, the plural sensor readings comprising an inertial sensor reading (e.g., inertial sensor reading 250-1), a kinematics sensor reading (e.g., kinematics sensor reading 251-1), and an odometry sensor reading (e.g., odometry sensor reading 252-1).

At 804, the computer-implemented method 800 can comprise obtaining, by the system (e.g., obtaining component 214), the plural sensor readings defining movement of the vehicle.

At 806, the computer-implemented method 800 can comprise adjusting, by the system (e.g., processor 206), a magnitude or frequency of the sensing.

At 808, the computer-implemented method 800 can comprise generating, by the system (e.g., generation component 220), plural measurements based on the plural sensor readings.

At 810, the computer-implemented method 800 can comprise adjusting, by the system (e.g., covariance component 216), the plural measurements relative to one another based on observed noise.

Figure 9:
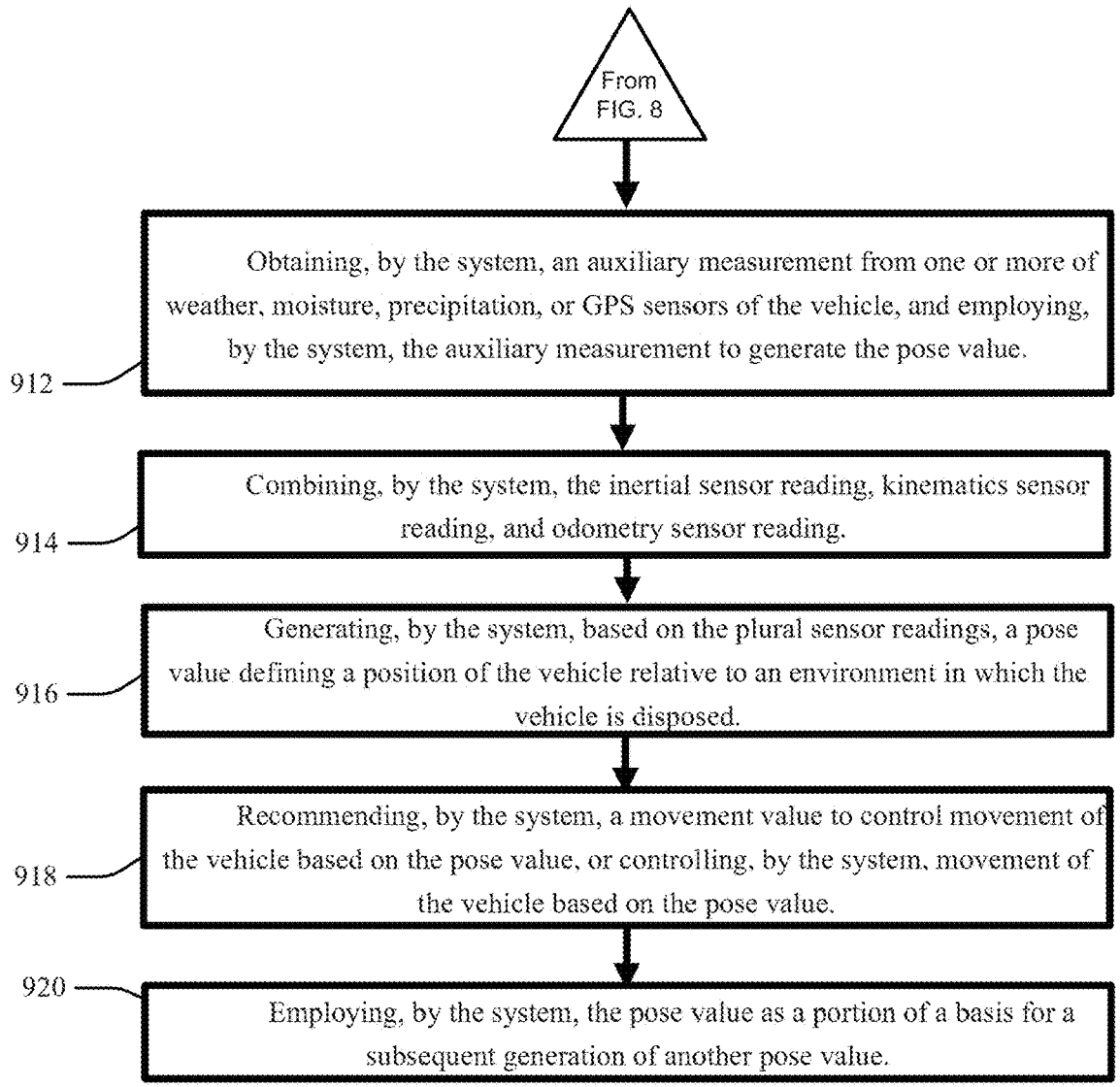
FIG. 9 illustrates a continuation of the process flow of FIG. 8, in accordance with one or more embodiments described herein.

The computer-implemented method 800 continues at FIG. 9.

At 912, the computer-implemented method 800 can comprise obtaining, by the system (e.g., obtaining component 214), an auxiliary measurement (e.g., auxiliary measurements 254-1) from one or more of weather, moisture, precipitation, and/or GPS, sensors (e.g., auxiliary sensor 254).

At 914, the computer-implemented method 800 can comprise combining, by the system (e.g., generation component 220), the inertial sensor reading, kinematics sensor reading, and odometry sensor reading.

At 916, the computer-implemented method 800 can comprise generating, by the system (e.g., generation component 220), based on the plural sensor readings, a pose value defining a position of the vehicle relative to an environment in which the vehicle is disposed.

At 918, the computer-implemented method 800 can comprise recommending, by the system (e.g., output component 222), a movement value to control movement of the vehicle based on the pose value, or controlling, by the system (e.g., output component 222), movement of the vehicle based on the pose value.

At 920, the computer-implemented method 800 can comprise employing, by the system (e.g., generation component 220), the pose value as a portion of a basis for a subsequent generation of another pose value.

In summary, a lightweight pose estimator (e.g., pose estimation system) describe herein can determine vehicle pose for autonomous maneuvers, such as emergency braking applications in low-speed maneuvers. To achieve this detection, employed are one or more inertial sensors, kinematics sensors, and odometry sensors to provide a high-efficient pose estimation. The proposed lightweight pose estimator can be extremely responsive to dynamically changing movement of a vehicle, such as an autonomously drivable vehicle. The proposed pose estimator can enable an efficient instantaneous interaction of an autonomous emergency braking pipeline with the dynamically changing environment.

In further summary, one or more embodiments herein can enable a process to determine dead-reckoning localization of a vehicle. An exemplary system can comprise a memory that stores computer executable components, and a processor that executes the computer executable components stored in the memory, wherein the computer executable components can comprise an obtaining component that obtains plural sensor readings defining movement of a vehicle, wherein the plural sensor readings comprise an inertial sensor reading, a kinematics sensor reading, and an odometry sensor reading, and a generation component that generates, based on the plural sensor readings, a pose value defining a position of the vehicle relative to an environment in which the vehicle is disposed. A sensing sub-system of the exemplary system can comprise an inertial measurement unit sensor, a kinematics sensor, and an odometry sensor.

The one or more innovations, frameworks, systems, devices and/or methods described herein can be additionally, and/or alternatively described as follows:

A system can comprise a memory that stores computer executable components, and a processor that executes the computer executable components stored in the memory, wherein the computer executable components comprise an obtaining component that obtains plural sensor readings defining movement of a vehicle, wherein the plural sensor readings comprise an inertial sensor reading, a kinematics sensor reading, and an odometry sensor reading, and a generation component that generates, based on the plural sensor readings, a pose value defining a position of the vehicle relative to an environment in which the vehicle is disposed.

The system can optionally further comprise plural sensing elements that sense movement of the vehicle to thereby provide the plural sensor readings.

The system of any one of the above paragraphs can further comprise wherein the generation component combines the inertial sensor reading, kinematics sensor reading, and odometry sensor reading to generate the pose value defining the position of the vehicle.

The system of any one of the above paragraphs can further comprise a covariance component that adjusts measurements based on the sensor readings relative to one another based on observed noise.

The system of any one of the above paragraphs can optionally further comprise an auxiliary sensing component that provides an auxiliary measurement from one or more of weather, moisture, precipitation or GPS sensors of the vehicle, wherein the auxiliary measurement is employed by the generation component to generate the pose value or by the covariance component to adjust the measurements.

The system of any one of the above paragraphs can optionally further comprise an output component that recommends a movement value for movement of the vehicle based on the pose value.

Relative to the system of any one of the above paragraphs, the inertial sensor reading can comprise one or more of a lateral acceleration, longitudinal acceleration, vertical acceleration, angular velocity in roll, angular velocity in pitch, or angular velocity in yaw.

Relative to the system of any one of the above paragraphs, optionally, the kinematics sensor reading can comprise one or more of a lateral velocity, longitudinal velocity, or pinion angle.

Relative to the system of any one of the above paragraphs, optionally, the odometry sensor reading can comprise one or more of a rear left wheel speed or rear right wheel speed.

A computer-implemented method can comprise obtaining, by a system operatively coupled to a processor, plural sensor readings defining movement of a vehicle, wherein the plural sensor readings comprise an inertial sensor reading, a kinematics sensor reading, and an odometry sensor reading, and generating, by the system, based on the plural sensor readings, a pose value defining a position of the vehicle relative to an environment in which the vehicle is disposed.

The computer-implemented method can further comprise combining, by the system, the inertial sensor reading, kinematics sensor reading, and odometry sensor reading, and employing, by the system, the combination of the sensor readings to generate the pose value defining the position of the vehicle.

The computer-implemented method of any one of the aforementioned paragraphs can further comprise adjusting, by the system, measurements based on the sensor readings relative to one another based on observed noise.

The computer-implemented method of any one of the aforementioned paragraphs can further comprise recommending, by the system, a movement value for movement of the vehicle based on the pose value, or controlling, by the system, movement of the vehicle based on the pose value.

The computer-implemented method of any one of the aforementioned paragraphs can further comprise sensing, by plural sensors of the system, movement, position, or a combination thereof of the vehicle to thereby generate the plural sensor readings.

The computer-implemented method of any one of the aforementioned paragraphs can further comprise adjusting, by the system, a magnitude or frequency of sampling of the sensing.

The computer-implemented method of any one of the aforementioned paragraphs can further comprise employing, by the system, the pose value as a portion of a basis for a subsequent generation of another pose value.

The computer implemented method of any one of the aforementioned paragraphs can further comprise obtaining an auxiliary measurement from one or more of weather, moisture, precipitation or GPS sensors of the vehicle, wherein the auxiliary measurement is employed to generate the pose value or by the covariance component to adjust the measurements.

An advantage of the device, system, computer-implemented method and/or computer program product discussed above can be a lightweight pose estimation process that can be employed rapidly relative to unforeseen, emergency and/or otherwise unintended changes in movement vehicle. That is, the estimation process can be performed to provide accurate measurements at real time.

Another advantage of the device, system, computer-implemented method and/or computer program product discussed above can be provision of a global pose estimation, where the provision can comprise low memory consumption, restricted data vectors and/or reduced computation, such as compared to conventional approaches.

Another advantage of the device, system, computer-implemented method and/or computer program product discussed above can be rapid provision of a recommendation or control for movement of the vehicle, such as where the vehicle is already in motion. That is, a heavyweight estimation process cannot quickly provide the data necessary to allow a rapid provision of a recommendation or control for movement (e.g., maneuver, motion planning, and/or the like) of a vehicle, particularly relative to heavyweight external-sensor-based estimation.

Another advantage of the device, system, computer-implemented method and/or computer program product discussed above can be ability to provide such pose estimation upon signal loss (e.g., WiFi or other signal), external sensor failure, and/or external sensor obfuscation, such as due to weather.

Yet another advantage of the device, system, computer-implemented method and/or computer program product discussed above can be employment of an artificial intelligence (AI) model, neural network (NN), machine learning (ML) model and/or deep learning (DL) model to generate measurements from sensor readings defining movement of a vehicle and/or to adjust one or more sensor readings and/or measurements determined therefrom relative to one another based on observed noise. The noise can comprise variance and/or error attributable to system noise, weather and/or the like. The separate measurements, and thus the separate sensor readings from which the measurements are generated, can be combined and/or fused to provide an accurate and efficient global pose estimation of the vehicle, whether stationary or moving.

Put another way, a hybrid model localizer can fuse the estimates from an IMU motion model, kinematics bicycle model, and wheel odometry model. A time-varying linear IMU model can be adopted as an initial, prediction step, and the kinematics bicycle model and wheel odometry model can be treated as pseudo-measurements, with all three models being fused via a sequential Kalman Filter. Thus, the localization accuracy can be improved, and the computational efficiency can be improved over conventional frameworks. Moreover, a dynamic noise covariance estimator can be employed for the hybrid model localizer that can dynamically adjust the noise covariance matrices for each sensor model at runtime. Thus, the localization accuracy for different driving scenarios can be enabled. Also, the localization results can be made robust when large measurement noise occurs or when a sensor fails.

Indeed, in view of the one or more embodiments described herein, a practical application of the systems, computer-implemented methods, and/or computer program products described herein can be an increase in accuracy and/or availability of pose data for use in situations of emergency, unintended actions and/or unforeseen occurrences relative to a moving or stationary vehicle, such as a moving vehicle driving at least partially autonomously. Overall, such computerized tools can constitute a concrete and tangible technical improvement in the fields of autonomous driving systems and/or pose estimation systems, without being limited thereto.

One or more embodiments described herein can be inherently and/or inextricably tied to computer technology and cannot be implemented outside of a computing environment. For example, one or more processes performed by one or more embodiments described herein can more efficiently, and even more feasibly, provide program and/or program instruction execution, such as relative to pose estimation about a vehicle, such as a moving vehicle, as compared to existing systems and/or techniques lacking such approach(es). Systems, computer-implemented methods, and/or computer program products providing performance of these processes are of great utility in the fields of autonomous driving systems and/or pose estimation systems and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately, and/or effectively electronically manage raw sensor data to generate inertial, kinematics and/or odometry measurements, and/or fuse such sensor measurements with one another and/or with auxiliary sensor data from a moving vehicle to generate a virtual pose estimation for use by an autonomous driving vehicle, as the one or more embodiments described herein can provide this process. Further, a human, or even thousands of humans, cannot efficiently, accurately, and/or effectively use an AI, NN, ML and/or DL model to generate inertial, kinematics and/or odometry measurements and/or balance such sensor measurements relative to system noise, as the one or more embodiments described herein can provide this process. And, neither can the human mind nor a human with pen and paper electronically effectively electronically achieve, provide and/or execute such processes, as conducted by one or more embodiments described herein.

In one or more embodiments, one or more of the processes and/or frameworks described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, cloud computing systems, computer architecture, and/or another technology.

One or more embodiments described herein can be fully operational towards performing one or more other functions (e.g., fully powered on, fully executed and/or another function) while also performing one or more of the one or more operations described herein.

Figure 10:
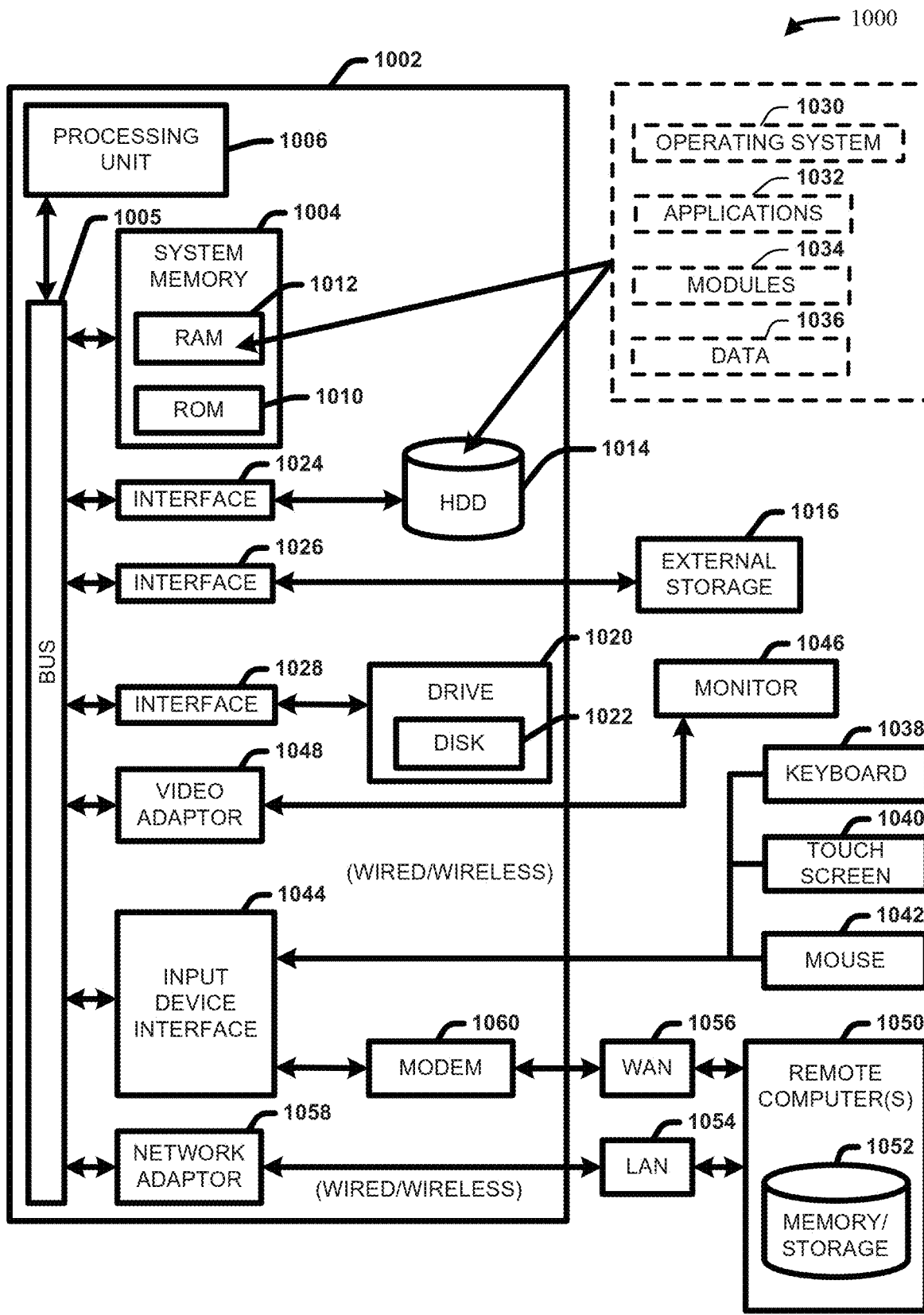
FIG. 10 illustrates a block diagram of an example, non-limiting, operating environment in which one or more embodiments described herein can be operated.
Figure 11:
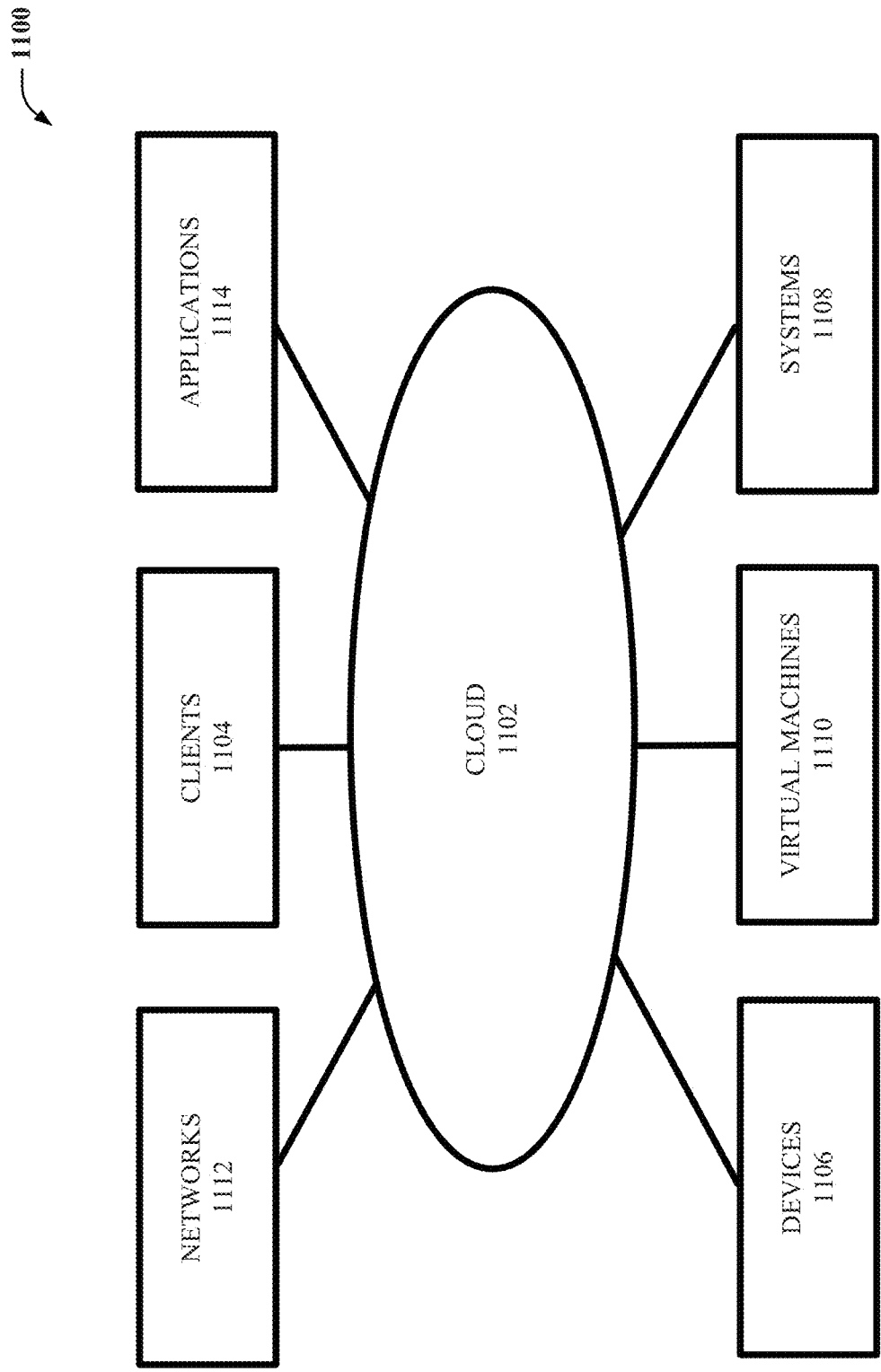
FIG. 11 illustrates a block diagram of an example, non-limiting, cloud computing environment in accordance with one or more embodiments described herein.

Turning next to FIGS. 10 and 11, a detailed description is provided of additional context for the one or more embodiments described herein at FIGS. 1-9.

FIG. 10 and the following discussion are intended to provide a brief, general description of a suitable operating environment 1000 in which one or more embodiments described herein at FIGS. 1-9 can be implemented. For example, one or more components and/or other aspects of embodiments described herein can be implemented in or be associated with, such as accessible via, the operating environment 1000. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, the aforedescribed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD), and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory, and/or computer-readable media that are not only propagating transitory signals per se.

Computer-readable storage media can be accessed by one or more local or remote computing devices, e.g., via access requests, queries, and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared, and/or other wireless media.

With reference still to FIG. 10, the example operating environment 1000 for implementing one or more embodiments of the aspects described herein can include a computer 1002, the computer 1002 including a processing unit 1006, a system memory 1004 and/or a system bus 1005. One or more aspects of the processing unit 1006 can be applied to processors such as 106 and/or 206 of the non-limiting systems 100 and/or 200. The processing unit 906 can be implemented in combination with and/or alternatively to processors such as 106 and/or 206.

Memory 1004 can store one or more computer and/or machine readable, writable and/or executable components and/or instructions that, when executed by processing unit 1006 (e.g., a classical processor, and/or like processor), can provide performance of operations defined by the executable component(s) and/or instruction(s). For example, memory 1004 can store computer and/or machine readable, writable, and/or executable components and/or instructions that, when executed by processing unit 1006, can provide execution of the one or more functions described herein relating to non-limiting system 100 and/or non-limiting system 200, as described herein with or without reference to the one or more figures of the one or more embodiments.

Memory 1004 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM), and/or the like) that can employ one or more memory architectures.

Processing unit 1006 can comprise one or more types of processors and/or electronic circuitry (e.g., a classical processor and/or like processor) that can implement one or more computer and/or machine readable, writable and/or executable components and/or instructions that can be stored at memory 1004. For example, processing unit 1006 can perform one or more operations that can be specified by computer and/or machine readable, writable, and/or executable components and/or instructions including, but not limited to, logic, control, input/output (I/O), arithmetic, and/or the like. In one or more embodiments, processing unit 1006 can be any of one or more commercially available processors. In one or more embodiments, processing unit 1006 can comprise one or more central processing unit, multi-core processor, microprocessor, dual microprocessors, microcontroller, System on a Chip (SOC), array processor, vector processor, and/or another type of processor. The examples of processing unit 1006 can be employed to implement one or more embodiments described herein.

The system bus 1005 can couple system components including, but not limited to, the system memory 1004 to the processing unit 1006. The system bus 1005 can comprise one or more types of bus structure that can further interconnect to a memory bus (with or without a memory controller), a peripheral bus, and/or a local bus using one or more of a variety of commercially available bus architectures. The system memory 1004 can include ROM 1010 and/or RAM 1012. A basic input/output system (BIOS) can be stored in a non-volatile memory such as ROM, erasable programmable read only memory (EPROM) and/or EEPROM, which BIOS contains the basic routines that help to transfer information among elements within the computer 1002, such as during startup. The RAM 1012 can include a high-speed RAM, such as static RAM for caching data.

The computer 1002 can include an internal hard disk drive (HDD) 1014 (e.g., EIDE, SATA), one or more external storage devices 1016 (e.g., a magnetic floppy disk drive (FDD), a memory stick or flash drive reader, a memory card reader and/or the like) and/or a drive 1020, e.g., such as a solid state drive or an optical disk drive, which can read or write from a disk 1022, such as a CD-ROM disc, a DVD, a BD and/or the like. Additionally, and/or alternatively, where a solid state drive is involved, disk 1022 could not be included, unless separate. While the internal HDD 1014 is illustrated as located within the computer 1002, the internal HDD 1014 can also be configured for external use in a suitable chassis (not shown). Additionally, while not shown in operating environment 1000, a solid state drive (SSD) can be used in addition to, or in place of, an HDD 1014. The HDD 1014, external storage device(s) 1016 and drive 1020 can be connected to the system bus 1005 by an HDD interface 1024, an external storage interface 1026 and a drive interface 1028, respectively. The HDD interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 1012, including an operating system 1030, one or more applications 1032, other program modules 1034 and/or program data 1036. All or portions of the operating system, applications, modules, and/or data can also be cached in the RAM 1012. The systems and/or methods described herein can be implemented utilizing one or more commercially available operating systems and/or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In a related embodiment, operating system 1030 can comprise one virtual machine (VM) of multiple VMs hosted at computer 1002. Furthermore, operating system 1030 can provide runtime environments, such as the JAVA runtime environment or the .NET framework, for applications 1032. Runtime environments are consistent execution environments that can allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and/or settings for an application.

Further, computer 1002 can be enabled with a security module, such as a trusted processing module (TPM). For instance, with a TPM, boot components hash next in time boot components and wait for a match of results to secured values before loading a next boot component. This process can take place at any layer in the code execution stack of computer 1002, e.g., applied at application execution level and/or at operating system (OS) kernel level, thereby enabling security at any level of code execution.

An entity can enter and/or transmit commands and/or information into the computer 1002 through one or more wired/wireless input devices, e.g., a keyboard 1038, a touch screen 1040 and/or a pointing device, such as a mouse 1042. Other input devices (not shown) can include a microphone, an infrared (IR) remote control, a radio frequency (RF) remote control, and/or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint and/or iris scanner, and/or the like. These and other input devices can be connected to the processing unit 1006 through an input device interface 1044 that can be coupled to the system bus 1005, but can be connected by other interfaces, such as a parallel port, an IEEE 1394 serial port, a game port, a USB port, an IR interface, a BLUETOOTH® interface, and/or the like.

A monitor 1046 or other type of display device can be alternatively and/or additionally connected to the system bus 1005 via an interface, such as a video adapter 1048. In addition to the monitor 1046, a computer typically includes other peripheral output devices (not shown), such as speakers, printers, and/or the like.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device and/or other common network node, and typically includes many or all of the elements described relative to the computer 1002, although, for purposes of brevity, only a memory/storage device 1052 is illustrated. Additionally, and/or alternatively, the computer 1002 can be coupled (e.g., communicatively, electrically, operatively, optically and/or the like) to one or more external systems, sources, and/or devices (e.g., computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and/or non-proprietary communication protocols. In a related example, one or more embodiments described herein can include hardware (e.g., a central processing unit (CPU), a transceiver, a decoder, and/or the like), software (e.g., a set of threads, a set of processes, software in execution and/or the like) and/or a combination of hardware and/or software that provides communicating information among one or more embodiments described herein and external systems, sources, and/or devices (e.g., computing devices, communication devices and/or the like).

The logical connections depicted include wired/wireless connectivity to a local area network (LAN) 1054 and/or larger networks, e.g., a wide area network (WAN) 1056. LAN and WAN networking environments can be commonplace in offices and companies and can provide enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can provide wired and/or wireless communication to the LAN 1054, which can also include a wireless access point (AP) disposed thereon for communicating with the adapter 1058 in a wireless mode.

When used in a WAN networking environment, the computer 1002 can include a modem 1060 and/or can be connected to a communications server on the WAN 1056 via other means for establishing communications over the WAN 1056, such as by way of the Internet. The modem 1060, which can be internal and/or external and a wired and/or wireless device, can be connected to the system bus 1005 via the input device interface 1044. In a networked environment, program modules depicted relative to the computer 1002 or portions thereof can be stored in the remote memory/storage device 1052. The network connections shown are merely exemplary and one or more other means of establishing a communications link among the computers can be used.

When used in either a LAN or WAN networking environment, the computer 1002 can access cloud storage systems or other network-based storage systems in addition to, and/or in place of, external storage devices 1016 as described above, such as but not limited to, a network virtual machine providing one or more aspects of storage and/or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, such as with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices and/or entities operatively disposed in wireless communication, e.g., a printer, scanner, desktop, and/or portable computer, portable data assistant, communications satellite, telephone, and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be employed relative to distributed computing environments (e.g., cloud computing environments), such as described below with respect to FIG. 11, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1102 described below with reference to illustration

1100 of FIG. 11. For instance, one or more embodiments described herein and/or components thereof can employ such one or more resources to execute one or more: mathematical function, calculation and/or equation; computing and/or processing script; algorithm; model (e.g., artificial intelligence (AI) model, machine learning (ML) model, deep learning (DL) model, and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed. That is, the one or more embodiments described herein can be implemented in a local environment only, and/or a non-cloud-integrated distributed environment, for example.

A cloud computing environment can provide one or more of low coupling, modularity and/or semantic interoperability. At the heart of cloud computing is an infrastructure that includes a network of interconnected aspects.

Moreover, the non-limiting systems 100 and/or 200, and/or the example operating environment 1000 of FIG. 10, can be associated with and/or be included in cloud-based and/or partially-cloud-based system.

Referring now to details of one or more elements illustrated at FIG. 11, the illustrative cloud computing environment 1102 is depicted. Cloud computing environment 1102 can comprise one or more cloud computing nodes, virtual machines, and/or the like with which local computing devices used by cloud clients 1104, such as for example via one or more devices 1106, systems 1108, virtual machines 1110, networks 1112, and/or applications 1114.

The one or more cloud computing nodes, virtual machines and/or the like can be grouped physically or virtually, in one or more networks, such as local, distributed, private, public clouds, and/or a combination thereof. The cloud computing environment 1102 can provide infrastructure, platforms, virtual machines, and/or software for which a client 1104 does not maintain all or at least a portion of resources on a local device, such as a computing device. The various elements 1106 to 1112 are not intended to be limiting and are but some of various examples of computerized elements that can communicate with one another and/or with the one or more cloud computing nodes via the cloud computing environment 1102, such as over any suitable network connection and/or type.

The embodiments described herein can be directed to one or more of a system, a method, an apparatus, and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device, and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA), and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures, and/or the like that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
   a memory that stores computer executable components; and
   a processor that executes the computer executable components stored in the memory, wherein the computer executable components comprise:
   an obtaining component that obtains plural sensor readings defining movement of a vehicle, wherein the plural sensor readings comprise an inertial sensor reading, a kinematics sensor reading, and an odometry sensor reading;
   a generation component that generates, based on the plural sensor readings, a pose value defining a position of the vehicle relative to an environment in which the vehicle is disposed, wherein the generating comprises:
   determining, using a first model, a first pose value defining the position of the vehicle based on a first sensor reading that is one selected from the inertial sensor reading, the kinematics sensor reading, and the odometry sensor reading,
   determining, using a second model, a second pose value defining the position of the vehicle based on the first pose value and a second sensor reading that is a different one selected from the inertial sensor reading, the kinematics sensor reading, and the odometry sensor reading that is different from the first sensor reading, wherein the second model is distinct from the first model,
   determining, using a third model, a third pose value defining the position of the vehicle based on the second pose value and a third sensor reading that is another different one selected from the inertial sensor reading, the kinematics sensor reading, and the odometry sensor reading that is different from the first sensor reading and the second sensor reading, wherein the third model is distinct from the first model and the second model, and
   determining the pose value based on the third pose value; and
   an output component that recommends a movement value for movement of the vehicle based on the pose value.

2. The system of claim 1, further comprising:
   plural sensing elements that sense movement of the vehicle to thereby provide the plural sensor readings.

3. The system of claim 1, wherein the determining the pose value comprises:
   applying a filter to the third pose value.

4. The system of claim 1, wherein the computer executable components further comprise:
   a covariance component that adjusts the plural sensor readings relative to one another based on observed noise.

5. The system of claim 4, wherein:
   the obtaining further comprises: obtaining at least one auxiliary measurement, associated with the observed noise, from at least one of a weather sensor, a moisture sensor, a precipitation sensor, or a GPS sensor of the vehicle;
   the adjusting comprises adjusting the plural sensor readings based on the at least one auxiliary measurement.

6. The system of claim 1, wherein the determining the first pose value is based further on a previous pose value defining a previous position of the vehicle relative to the environment.

7. The system of claim 1, wherein the inertial sensor reading comprises at least one of a lateral acceleration, longitudinal acceleration, vertical acceleration, angular velocity in roll, angular velocity in pitch, or angular velocity in yaw, wherein the kinematics sensor reading comprises at least one of a lateral velocity, longitudinal velocity, or pinion angle, and wherein the odometry sensor reading comprises at least one of a rear left wheel speed or rear right wheel speed.

8. A computer-implemented method, comprising:
obtaining, by a system operatively coupled to a processor, plural sensor readings defining movement of a vehicle, wherein the plural sensor readings comprise an inertial sensor reading, a kinematics sensor reading, and an odometry sensor reading;
generating, by the system, based on the plural sensor readings, a pose value defining a position of the vehicle relative to an environment in which the vehicle is disposed, wherein the generating comprises:
determining, using a first model, a first pose value defining the position of the vehicle based on a first sensor reading that is one selected from the inertial sensor reading, the kinematics sensor reading, and the odometry sensor reading,
determining, using a second model, a second pose value defining the position of the vehicle based on the first pose value and a second sensor reading that is a different one selected from the inertial sensor reading, the kinematics sensor reading, and the odometry sensor reading that is different from the first sensor reading, wherein the second model is distinct from the first model,
determining, using a third model, a third pose value defining the position of the vehicle based on the second pose value and a third sensor reading that is another different one selected from the inertial sensor reading, the kinematics sensor reading, and the odometry sensor reading that is different from the first sensor reading and the second sensor reading, wherein the third model is distinct from the first model and the second model, and
determining the pose value based on the third pose value; and
recommending, by the system, a movement value for movement of the vehicle based on the pose value.

9. The computer-implemented method of claim 8, wherein the determining the pose value comprises applying a filter to the third pose value.

10. The computer-implemented method of claim 8, wherein the generating further comprises:
adjusting, by the system, the plural sensor readings relative to one another based on observed noise determined via at least one auxiliary measurement from one or more at least one of a weather sensor, a moisture sensor, a precipitation sensor, or a GPS sensor of the vehicle.

11. The computer-implemented method of claim 8, further comprising:
controlling, by the system, the movement of the vehicle based on the pose movement value.

12. The computer-implemented method of claim 8, further comprising:
sensing, by plural sensors of the system, movement, position, or a combination thereof of the vehicle to thereby generate the plural sensor readings.

13. The computer-implemented method of claim 8, wherein the determining the first pose value is based further on a previous pose value defining a previous position of the vehicle relative to the environment.

14. The computer-implemented method of claim 9, further comprising:
employing, by the system, the pose value as a portion of a basis for a subsequent generation of another pose value.

15. A computer program product providing a process to determine dead-reckoning localization of a vehicle, the computer program product comprising a computer readable storage medium having program instructions embodied therewith, the program instructions executable by a processor to cause the processor to:
obtain, by the processor, plural sensor readings defining movement of the vehicle, wherein the plural sensor readings comprise an inertial sensor reading, a kinematics sensor reading, and an odometry sensor reading;
generate, by the processor, based on the plural sensor readings, a pose value defining a position of the vehicle relative to an environment in which the vehicle is disposed, wherein the generating comprises:
determining, using a first model, a first pose value defining the position of the vehicle based on a first sensor reading that is one selected from the inertial sensor reading, the kinematics sensor reading, and the odometry sensor reading,
determining, using a second model, a second pose value defining the position of the vehicle based on the first pose value and a second sensor reading that is a different one selected from the inertial sensor reading, the kinematics sensor reading, and the odometry sensor reading that is different from the first sensor reading, wherein the second model is distinct from the first model, and
determining, using a third model, a third pose value defining the position of the vehicle based on the second pose value and a third sensor reading that is another different one selected from the inertial sensor reading, the kinematics sensor reading, and the odometry sensor reading that is different from the first sensor reading and the second sensor reading, wherein the third model is distinct from the first model and the second model, and
determining the pose value based on the third pose value; and
control, by the processor, the movement of the vehicle based on the pose value.

16. The computer program product of claim 15, wherein the determining the pose value comprises applying a filter to the third pose value.

17. The computer program product of claim 15, wherein the generating further comprises:
adjusting the plural sensor readings relative to one another based on observed noise determined via at least one auxiliary measurement from one or more at least one of a weather sensor, a moisture sensor, a precipitation sensor, or a GPS sensor of the vehicle.

18. The computer program product of claim 15, wherein the determining the first pose value is based further on a previous pose value defining a previous position of the vehicle relative to the environment.

19. The computer program product of claim 15, wherein the inertial sensor reading comprises at least one of a lateral acceleration, longitudinal acceleration, vertical acceleration, angular velocity in roll, angular velocity in pitch, or angular velocity in yaw, wherein the kinematics sensor reading comprises at least one of a lateral velocity, longitudinal velocity, or pinion angle, and wherein the odometry sensor reading comprises at least one of a rear left wheel speed or rear right wheel speed.

20. The computer program product of claim 15, wherein the program instructions are further executable by the processor to cause the processor to:

sense, by the processor, via plural sensors, movement, position, or a combination thereof of the vehicle to thereby generate the plural sensor readings; and adjust, by the processor, a magnitude or frequency of sampling of the sensing.

* * * * *